US008958565B2

(12) United States Patent
Jeong et al.

(10) Patent No.: US 8,958,565 B2
(45) Date of Patent: Feb. 17, 2015

(54) APPARATUS FOR CONTROLLING DEPTH/DISTANCE OF SOUND AND METHOD THEREOF

(75) Inventors: Sangoh Jeong, Seoul (KR); Hyunsoo Kim, Seoul (KR); Byeongmoon Jeon, Seoul (KR); Kyuwoon Kim, Seoul (KR); Joonwon Bhang, Seoul (KR)

(73) Assignee: LG Electronics Inc., Seoul (KR)

( * ) Notice: Subject to any disclaimer, the term of this patent is extended or adjusted under 35 U.S.C. 154(b) by 506 days.

(21) Appl. No.: 13/425,061

(22) Filed: Mar. 20, 2012

(65) Prior Publication Data

US 2012/0243689 A1   Sep. 27, 2012

(30) Foreign Application Priority Data

Mar. 21, 2011   (KR) .................. 10-2011-0024853
Sep. 1, 2011    (KR) .................. 10-2011-0088372

(51) Int. Cl.
*H04R 5/00*   (2006.01)
*G06T 7/20*   (2006.01)
*H04S 7/00*   (2006.01)
*H04S 1/00*   (2006.01)
*H04S 3/00*   (2006.01)

(52) U.S. Cl.
CPC ............... *G06T 7/2053* (2013.01); *H04S 7/30* (2013.01); *G06T 2207/10028* (2013.01); *H04S 2400/11* (2013.01); *H04S 2420/01* (2013.01); *H04S 1/007* (2013.01); *H04S 3/008* (2013.01); *H04S 2420/07* (2013.01)
USPC ............................................. 381/17; 381/306

(58) Field of Classification Search
USPC ..................... 381/17, 306, 310, 303
See application file for complete search history.

(56) References Cited

U.S. PATENT DOCUMENTS

2011/0007915 A1* 1/2011 Park .............................. 381/306

FOREIGN PATENT DOCUMENTS

| JP | 2011-35784 A | 2/2011 |
| KR | 10-2009-0107453 A | 10/2009 |
| KR | 10-2010-0066289 A | 6/2010 |

* cited by examiner

*Primary Examiner* — Paul S Kim
(74) *Attorney, Agent, or Firm* — Birch, Stewart, Kolasch & Birch, LLP

(57) ABSTRACT

An apparatus for controlling depth/distance of sound and method thereof are disclosed, by which an audio signal can be outputted to correspond to a depth of an image, i.e., a disparity in displaying a stereoscopic image. The present invention includes extracting at least one object from an image, measuring a depth change value in accordance with a motion of the object within the image, and changing a depth/distance level of the sound based on the depth change value of the object.

27 Claims, 20 Drawing Sheets

US 8,958,565 B2

APPARATUS FOR CONTROLLING DEPTH/DISTANCE OF SOUND AND METHOD THEREOF

This application claims the benefit of the Korean Patent Application Nos. 10-2011-0024853, filed on Mar. 21, 2011 and 10-2011-0088372 filed on Sep. 1, 2011, which are hereby incorporated by reference as if fully set forth herein.

BACKGROUND OF THE INVENTION

1. Field of the Invention

The present invention relates to an apparatus for controlling depth/distance of sound and method thereof. Although the present invention is suitable for a wide scope of applications, it is particularly suitable for outputting an audio signal corresponding to depth of an object existing in a binocular disparity image.

2. Discussion of the Related Art

Recently, the ongoing development of the related technology enables a technology of obtaining stereoscopic information of an object from a stereoscopic image to be applied to various fields of game, surveillance camera, vehicle camera and the like. Yet, an applied example of extracting and using stereoscopic information such as depth information and the like from a stereoscopic image has not been sufficiently developed. In case of a current 3D content, although individual effects of image and sound sensed by a viewer are represented well, an effect of a technology of outputting sound suitable for a stereoscopic effect of a stereoscopic image is limited to how well the stereoscopic effect reflects the sound when a producer produces a content. Meanwhile, if is very difficult for a producer to have a sound reflect a stereoscopic effect of an object. Moreover, despite the rapid spreading of stereoscopic image systems and the advent of a technology of outputting a conventional image as a stereoscopic image, it is difficult for sound to reflect a stereoscopic effect of an image in numerous contents.

Therefore, the demand for implementing stereoscopic sound interconnected to stereoscopic distance information by enabling a stereoscopic effect of a sound system to reflect visual distance sensed by a viewer from an object of a stereoscopic image itself is rising.

According to a related art, in order to create depth in an audio signal, the distance is reproduced in a manner of adjusting a sound level, using a level of artificial reverberation, or using a time interval level of early reflection. However, even if this related art algorithm is used, sound at a physical speaker location is heard loud or weak only. And, it is impossible to change a depth of sound from the physical speaker location to a head of a listener.

SUMMARY OF THE INVENTION

Accordingly, the present invention is directed to an apparatus for controlling depth/distance of sound and method thereof that substantially obviate one or more of the problems due to limitations and disadvantages of the related art.

An object of the present invention is to provide an apparatus for controlling depth/distance of sound and method thereof, by which an audio signal can be outputted to correspond to a depth of an image, i.e., a disparity in displaying a stereoscopic image.

Another object of the present invention is to provide an apparatus for controlling depth/distance of sound and method thereof, by which an object is extracted from an image in displaying a stereoscopic image and an audio signal can be outputted to correspond to a motion of the object.

Another object of the present invention is to provide an apparatus for controlling depth/distance of sound and method thereof, by which a significant disparity variation of an object in a stereoscopic image is determined and an audio signal is enabled to reflect the determined significant disparity variation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of controlling a depth/distance of sound according to a $1^{st}$ embodiment of the present invention includes the steps of extracting at least one object from an image, measuring a depth change value in accordance with a motion of the object within the image, and changing a depth/distance level of the sound based on the depth change value of the object.

Preferably, the method further includes the steps of determining whether a depth change of each object is a valid depth change and determining a corresponding object having a changeable depth/distance level of sound among objects respectively having valid depth change values.

More preferably, the step of determining whether the depth change of the each object is the valid depth change includes the step of determining whether the depth change of the each object is the valid depth change based on a difference between a depth level of each object in a previous frame of the image and a depth level of the each object in a current frame of the image. More preferably, the step of determining the corresponding object having the changeable depth/distance level of the sound includes the steps of selecting one object based on a difference between a depth level of each object in a previous frame of the image and a depth level of the each object in a current frame of the image.

To further achieve these and other advantages and in accordance with the purpose of the present invention, a method of controlling a depth/distance of sound according to a $2^{nd}$ embodiment of the present invention includes the steps of creating a histogram indicating the number of pixels in accordance with a depth level from a disparity image and changing a depth/distance level of the sound based on the histogram.

Preferably, the histogram crating step includes the steps of setting a plurality of depth levels in accordance with a depth of the image, determining the pixel number corresponding to each of a plurality of the depth levels, and creating the histogram based on the pixel number corresponding to each of a plurality of the depth levels.

Preferably, the step of changing a depth/distance level of the sound includes the steps of defining a plurality of depth levels in accordance with a depth of the image in the histogram, determining a sum of the pixel numbers in a plurality of the defined depth levels, and determining the depth/distance level of the sound based on the determined sum of the pixel numbers.

Preferably, the method further includes the steps of determining an early depth level of the image based on the histogram, correcting the early depth level of the image based on at least one selected from the group consisting of a depth change size of the image and a change frequency (count) of the image, and changing the depth/distance level of the sound based on the corrected depth level.

More preferably, the early depth level of the image is corrected based on an absolute value of a difference between depth levels of two contiguous frames in a predetermined interval of the image, the number of blocks/pixels failing to be matched in the disparity image or the number of pixels corresponding to a specific depth level of the histogram.

To further achieve these and other advantages and in accordance with the purpose of the present invention, an apparatus for controlling a depth/distance of sound according to a $1^{st}$ embodiment of the present invention includes an object extracting unit extracting at least one object from an image, a disparity measuring unit measuring a depth change value in accordance with a motion of the object within the image, and a level changing unit changing a depth/distance level of the sound based on the depth change value of the object.

To further achieve these and other advantages and in accordance with the purpose of the present invention, an apparatus for controlling a depth/distance of sound according to a $2^{nd}$ embodiment of the present invention includes a disparity measuring unit creating a histogram indicating the number of pixels in accordance with a depth level from a disparity image, a level changing unit changing a depth/distance level of the sound based on the histogram, and a level correcting unit correcting an early depth level of the image based on at least one selected from the group consisting of a depth change size of the image and a change frequency (count) of the image.

Preferably, the level correcting unit corrects the early depth level of the image in accordance with a difference between the depth level of a previous frame of the image and the depth level of a current frame of the image. More preferably, the early depth level of the image is corrected based on an absolute value of a difference between depth levels of two contiguous frames in a predetermined interval of the image, the number of blocks/pixels failing to be matched in the disparity image or the number of pixels corresponding to a specific depth level of the histogram.

Accordingly, the present invention provides the following effects and/or advantages.

First of all, the present invention can output stereoscopic sound corresponding to a depth of a stereoscopic image, thereby providing a viewer with sound having a more sense of realism.

Secondly, the present invention can output stereoscopic sound corresponding to a motion of an object in a stereoscopic image, thereby providing a viewer with sound having a more sense of realism.

Thirdly, the present invention enables sound to reflect a valid depth change of an object in a stereoscopic image, thereby providing a viewer with a harmonious image and sound.

Effects obtainable from the present invention are non-limited by the above mentioned effect. And, other unmentioned effects can be clearly understood from the following description by those having ordinary skill in the technical field to which the present invention pertains.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

$1^{st}$ Embodiment

Figure 1:
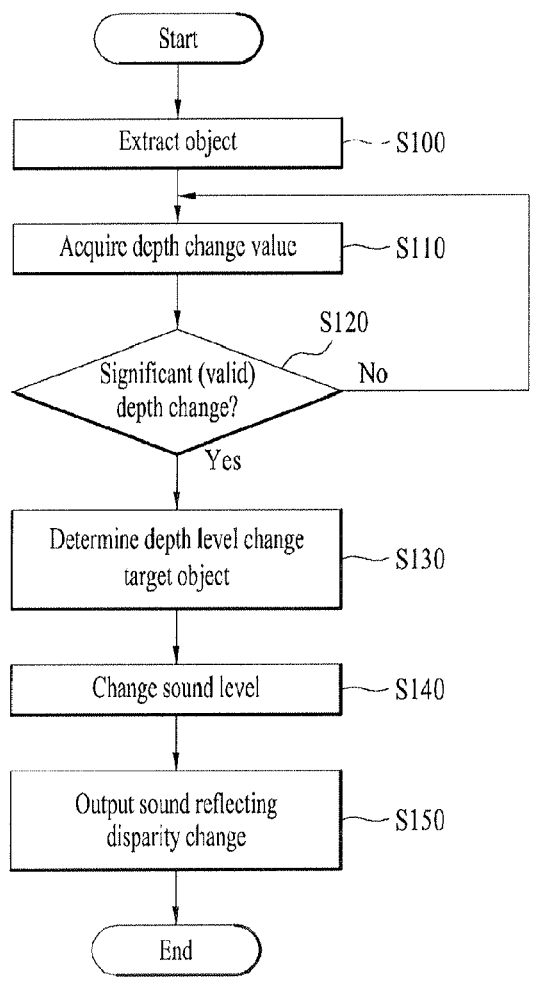
FIG. 1 is a flowchart for a method of controlling a depth of sound according to a $1^{st}$ embodiment of the present invention.

FIG. 1 is a flowchart for a method of controlling a depth/distance of sound corresponding to a disparity of a stereoscopic image object according to a $1^{st}$ embodiment of the present invention. In the following description, a method of controlling a depth of sound is explained in detail with reference to FIG. 1.

Referring to FIG. 1, an image inputted from an image input source, and more particularly, a non-disparity image such as a stereo 2-channel image, a 1-channel image, a time-of-flight camera image and the like is converted to a disparity image. In this case, the disparity image means an image including pixels each of which has a level value (or a color) varying in accordance with an extent of disparity between right and left images or a depth.

Subsequently, using the disparity image, at least one object existing in the image is extracted [S100]. In particular, a specific region to be analyzed is extracted by extracting an object from an image. Through this, a background region and a thing are discriminated from each other and an analysis target can be then simplified by removing an unnecessary background or thing. In doing so, an object may be extracted by probability distribution calculation or distinctive feature point extraction. Alternatively, it may be able to extract an object more accurately using at least one of the probability distribution calculation and the distinctive feature point extraction selectively or interchangeably in consideration of a type of an input image and complexity of the corresponding calculation.

Although the probability distribution calculation may basically use a histogram, its performance can be enhanced in a manner of applying various probability models suitable for property of an image or estimating probability distribution. In the distinctive feature point extraction, an object is extracted in a manner of detecting an edge of an image and the like and then extracting an outline of one body or a feature unchangeable by rotation or size of the body based on the detected edge and the like.

Thereafter, a depth change value of the extracted object is measured [S110]. In particular, in a manner of tracking a motion of the extracted object by frame unit, a change value of depth information in accordance with object motion in frames. For instance, if an inputted stereoscopic image is encoded into a color image and a depth image by being coded by MPEG-C Part 3, it may be able to calculate a depth of an object from a decoded image. For another instance, if an inputted stereoscopic image is encoded into a left eye image and a right eye image by being coded by MPEG-2 or the like, the left and right eye images are decoded and a depth of an object may be then calculated from information on a different angle of vision of the left and right eye images.

Meanwhile, according to the present invention, a distance between a display screen and an object perceived by a user is represented as a depth. Hence, if a user perceives an object to be situated in rear of a screen, a corresponding depth may be set to a negative value (−). If a user perceives an object to be situated in front of a screen, a corresponding depth may be set to a positive value (+). In particular, a level of a depth of an object increases in proportion to a projected extent toward a user. In more particular, the bigger an interval between a left eye image and a right eye image becomes, the greater a depth of an object in a stereoscopic image gets.

If a stereoscopic image is exemplarily represented as a left eye image and a right eye image, a position, at which a user perceives an image to be formed, varies in accordance with an interval between the left eye image and the right eye image. Hence, it may be able to adjust a depth of a stereoscopic or 3D (3-dimensional) image consisting of a left eye image and a right eye image in a manner of adjusting a display interval between the left eye image and the right eye image.

Subsequently, it is determined whether a depth value of the object is a significant (or valid) depth change that becomes a target to be changed into a depth level of sound [S120]. In particular, only a significant (valid) depth/disparity variation of an object is set to be reflected by a depth/distance level of sound. An example of a determining method for a case of an increasing depth of an object is described with reference o FIG. 2 as follows.

Figure 2:
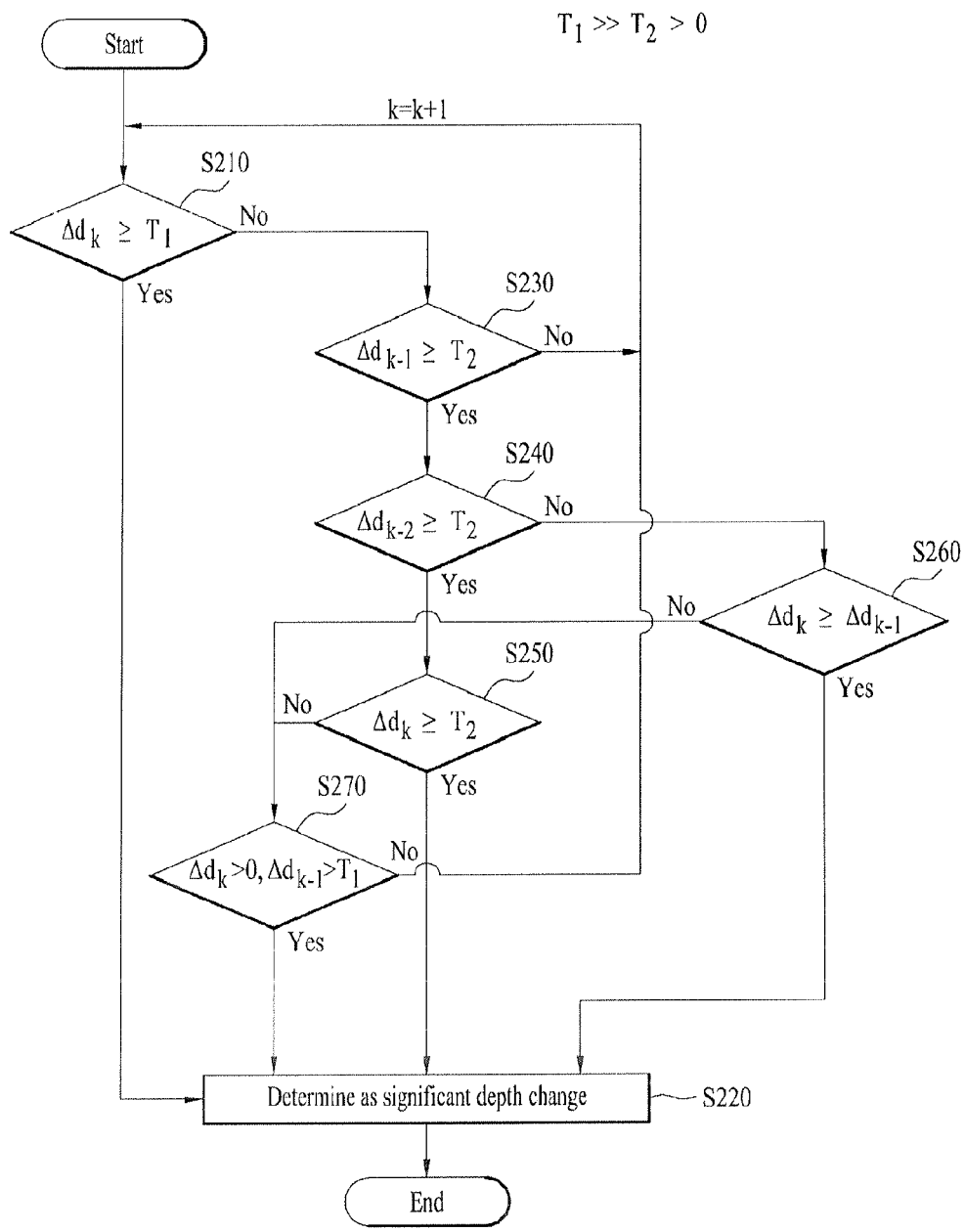
FIG. 2 and FIG. 3 are flowcharts for examples of a method of determining whether a depth change of an object is a significant depth change.

FIG. 2 is a flowchart for an example of a method of determining whether a depth change of an object is a significant depth change.

Referring to FIG. 2, assuming that a current frame for determining whether to change is 'k', it is determined whether a change value ($\Delta d_k$) of a depth of an object in a $k^{th}$ frame is sufficiently large [S210]. In particular, it is determined whether a difference ($\Delta d_k$) between the depth of the object in the $k^{th}$ frame and a depth of the object in a $(k-1)^{th}$ frame is greater than a preset $1^{st}$ reference value ($T_1$). If the depth change value ($\Delta d_k$) in the $k^{th}$ frame is equal to or greater than the preset $1^{st}$ reference value ($T_1$), the depth change of the corresponding object is determined as a significant (valid) depth change [S220].

On the contrary, if the depth change value ($\Delta d_k$) in the $k^{th}$ frame is smaller than the preset $1^{st}$ reference value ($T_1$), it is determined whether a change value ($\Delta d_{k-1}$) of the depth of the object in the $(k-1)^{th}$ frame right before the $k^{th}$ frame is sufficiently large [S230]. In particular, it is determined whether a difference ($\Delta d_{k-1}$) between the depth of the object in the $(k-1)^{th}$ frame and a depth of the object in a $(k-2)^{th}$ frame is greater than a $2^{nd}$ reference value ($T_2$) amounting to a preset quantity. In this case, the $2^{nd}$ reference value ($T_2$) can be set to have a value sufficiently smaller than the $1^{st}$ reference value ($T_1$). If the depth change value ($\Delta d_{k-1}$) in the $(k-1)^{th}$ frame is smaller than the preset $2^{nd}$ reference value ($T_2$), it is not determined as a significant change.

If the depth change value ($\Delta d_{k-1}$) in the $(k-1)^{th}$ frame is equal to or greater than the reference value, it is determined whether a depth change value ($\Delta d_{k-2}$) of the object in the $(k-2)^{th}$ frame is sufficiently large [S240]. In particular, it is determined whether a difference ($\Delta d_{k-2}$) between the depth of the object in the $(k-2)^{th}$ frame and a depth of the object in a $(k-1)^{th}$ frame is greater than the $2^{nd}$ reference value ($T_2$). If the dept change value ($\Delta d_{k-2}$) of the object in the $(k-2)^{th}$ frame is equal to or greater than the $2^{nd}$ reference value ($T_2$), the depth change value of the object can be determined as having increased over 2 frames contiguously and sufficiently. In this case, by determining whether the depth change value ($\Delta d_k$) of the object in the current frame k is sufficiently increased [S250], it is determined whether it is a significant (valid) depth change. In particular, if the difference ($\Delta d_k$) between the depth of the object in the $k^{th}$ frame and the depth of the object in the $(k-1)^{th}$ frame is equal to or greater than the $2^{nd}$ reference value ($T_2$), the object is determined as having a motion in a significant (valid) depth direction [S220].

On the contrary, if the depth change value ($\Delta d_{k-2}$) in the $(k-2)^{th}$ frame is not sufficiently large (i.e., smaller that the reference value), it can be observed that the object has a significant depth change occurring from the $(k-1)^{th}$ frame. In this case, the depth change value ($\Delta d_k$) of the object in the $k^{th}$ frame may be temporary. Hence, only if the depth change value is sufficiently greater than the $2^{nd}$ reference value ($T_2$) for determining a presence or non-presence of the depth change value, the object is regarded as initiating a motion in a significant depth direction [S220]. In particular, the depth change value ($\Delta d_k$) of the object in the $k^{th}$ frame and the depth change value ($\Delta d_k$) of the object in the $(k-1)^{th}$ frame are compared to each other [S260]. If the depth change value ($\Delta d_k$) of the object in the $k^{th}$ frame is greater than or equal to the depth change value ($\Delta d_k$) of the object in the $(k-1)^{th}$ frame, the depth change is determined as the significant change [S220].

Yet, in the step S250 of comparing the depth change value ($\Delta d_k$) of the object in the current frame k and the $2^{nd}$ reference value ($T_2$) to each other and the step S260 of comparing the depth change value ($\Delta d_k$) of the object in the $k^{th}$ frame and the depth change value ($\Delta d_k$) of the object in the $(k-1)^{th}$ frame to each other, when the determined result shows that the depth change is not the significant change, if the change value keeps increasing in the $k^{th}$ frame and the change value in the $(k-1)^{th}$ frame is sufficiently large, the depth change is determined as the significant change. In particular, if the depth change value ($\Delta d_k$) of the object in the $k^{th}$ frame is greater than 0 and the depth change value of the object in the $(k-1)^{th}$ frame is greater than the $1^{st}$ reference value ($T_1$), the depth change is determined as the significant change [S270].

In the following description, an example of a determining method for a case of a decreasing depth of an object is described with reference o FIG. 3 as follows. In the following description, if a depth decreases, a change value of a depth of an object in an image is defined as having a negative value. Yet, a size of a change value of a depth, i.e., an absolute value of the change value always has a positive value. Hence, in the following description, 'a change value' of a depth should be discriminated from 'a size (absolute value) of a change value'.

Figure 3:
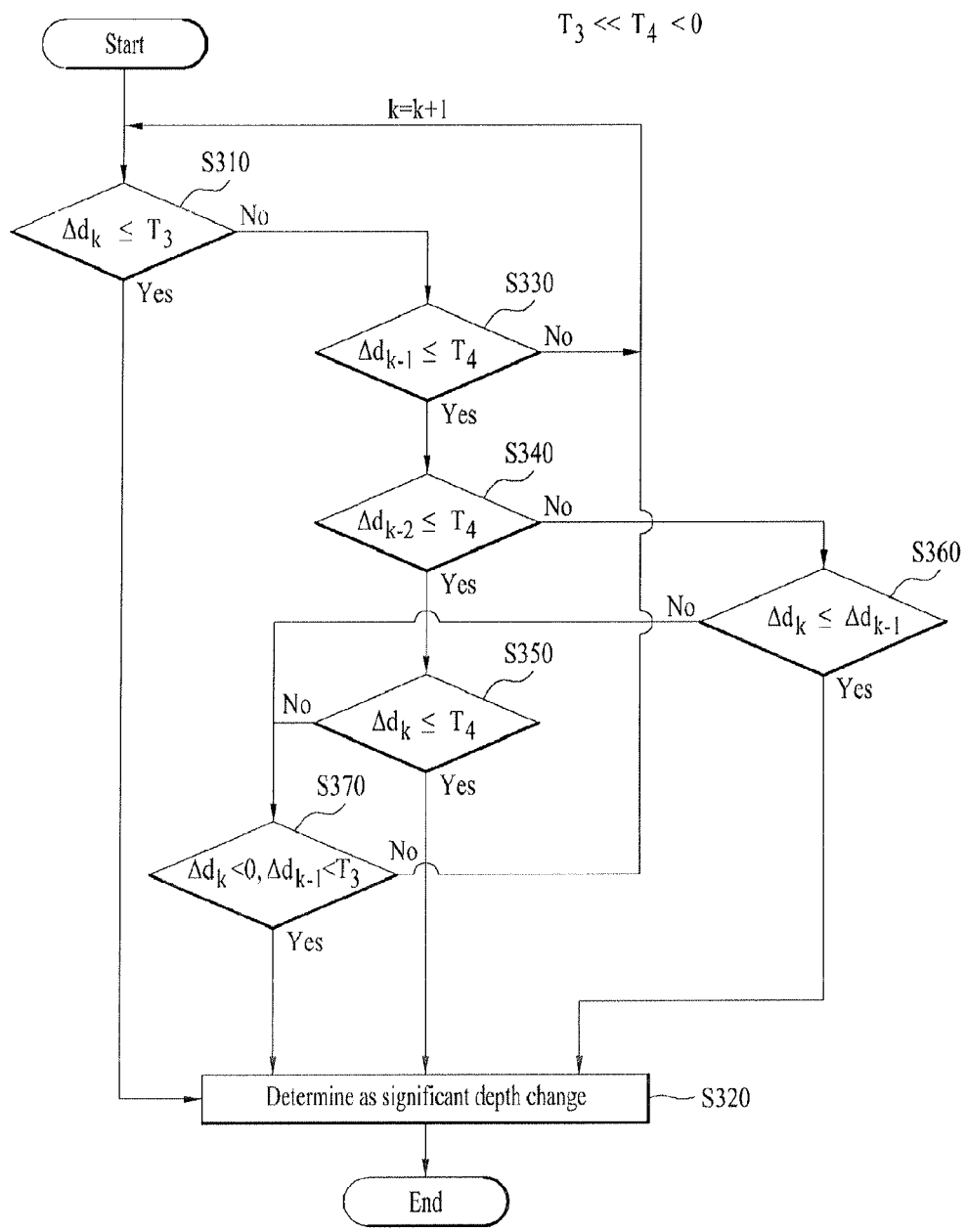

FIG. 3 is a flowchart for an example of a method of determining whether a depth change of an object is a significant depth change.

Referring to FIG. 3, assuming that a current frame for determining whether to change is 'k', it is determined whether a change value ($\Delta d_k$) of a depth of an object in a $k^{th}$ frame is sufficiently large [S310]. In particular, it is determined whether a change value ($\Delta d_k$) between the depth of the object in the $k^{th}$ frame and a depth of the object in a $(k-1)^{th}$ frame is smaller than a preset negative $3^{rd}$ reference value ($T_3$). If the depth change value ($\Delta d_k$) in the $k^{th}$ frame is equal to or smaller than the $3^{rd}$ reference value ($T_3$), i.e., if a size (absolute value) of the depth change value ($\Delta d_k$) is equal to or greater than the $3^{rd}$ reference value ($T_3$), a depth change of the object is determined as a significant depth change [S320].

On the contrary, if the depth change value ($\Delta d_k$) in the $k^{th}$ frame is greater than a preset reference value ($T_3$), i.e., if a size (absolute value) of the depth change value ($\Delta d_k$) is smaller than the $3^{rd}$ reference value ($T_3$), it is determined whether a change value ($\Delta d_{k-1}$) of the depth of the object in the $(k-1)^{th}$ frame right before the $k^{th}$ frame is sufficiently large [S330]. In particular, it is determined whether a difference ($\Delta d_{k-1}$) between the depth of the object in the $(k-1)^{th}$ frame and a depth of the object in a $(k-2)^{th}$ frame is smaller than a preset negative reference value ($T_4$), i.e., whether a size (absolute value) of the change value ($\Delta d_{k-1}$) is greater than an absolute value of the reference value ($T_4$). If the depth change value ($\Delta d_{k-1}$) in the $(k-1)^{th}$ frame is greater than the $4^{th}$ reference value ($T_4$) having a preset negative value, i.e., if the size (absolute value) of the change value ($\Delta d_{k-1}$) is greater than the absolute value of the reference value ($T_4$), it is not determined as a significant change [S320].

If the depth change value ($\Delta d_{k-1}$) in the $(k-1)^{th}$ frame is equal to or smaller than the $4^{th}$ reference value ($T_4$), it is determined whether a depth change value ($\Delta d_{k-2}$) of the object in the $(k-2)^{th}$ frame is sufficiently large [S340]. In particular, it is determined whether a difference ($\Delta d_{k-2}$) between the depth of the object in the $(k-2)^{th}$ frame and a depth of the object in a $(k-1)^{th}$ frame is smaller than the negative $4^{th}$ reference value ($T_4$), i.e., whether a size (absolute value) of the change value ($\Delta d_{k-1}$) is greater than an absolute value of the reference value ($T_4$).

In this case, if the dept change value ($\Delta d_{k-2}$) of the object in the $(k-2)^{th}$ frame is smaller than the $4^{th}$ reference value ($T_4$) as well, the depth change value of the object can be determined as having increased over 2 frames contiguously and sufficiently. In this case, by determining whether the depth change value ($\Delta d_k$) of the object in the current frame k is sufficiently increased [S350], it is determined whether it is a significant depth change. In particular, if the difference ($\Delta d_k$) between the depth of the object in the $k^{th}$ frame and the depth of the object in the $(k-1)^{th}$ frame is equal to or smaller than the negative $4^{th}$ value ($T_4$), the object is determined as having a motion in a significant depth direction [S320].

On the contrary, if the depth change value ($\Delta d_{k-2}$) in the $(k-2)^{th}$ frame is not sufficiently large (i.e., the absolute value of the change value ($\Delta d_{k-2}$) is greater than the absolute value of the $4^{th}$ reference value ($T_4$)), can be observed that the object has a significant depth change occurring from the $(k-1)^{th}$ frame. In this case, the depth change value ($\Delta d_k$) of the object in the $k^{th}$ frame may be temporary. Hence, only if the depth change value is sufficiently smaller than the negative $4^{th}$ reference value ($T_4$) for determining a presence or non-presence of the depth change value (i.e., only if the absolute value of the change value ($\Delta d_k$) is greater than the absolute value of the $4^{th}$ reference value ($T_4$)), the object is regarded as initiating a motion in a significant depth direction [S320]. On the contrary, if the absolute value of the change value ($\Delta d_{k-2}$) is smaller than the absolute value of the $4^{th}$ reference value ($T_4$), the depth change value ($\Delta d_k$) of the object in the $k^{th}$ frame and the depth change value ($\Delta d_k$) of the object in the $(k-1)^{th}$ frame are compared to each other [S360]. If the depth change value ($\Delta d_k$) of the object in the $k^{th}$ frame is smaller than or equal to the depth change value ($\Delta d_k$) of the object in the $(k-1)^{th}$ frame, the depth change is determined as the significant change [S320].

Yet, in the step S350 of comparing the depth change value ($\Delta d_k$) of the object in the current frame k and the $4^{th}$ reference value ($T_4$) to each other and the step S360 of comparing the depth change value ($\Delta d_k$) of the object in the $k^{th}$ frame and the depth change value ($\Delta d_k$) of the object in the $(k-1)^{th}$ frame to each other, when the determined result shows that the depth change is not the significant change, if the change value keeps decreasing in the $k^{th}$ frame and the size (absolute value) of the change value in the $(k-1)^{th}$ frame is sufficiently large, the depth change is determined as the significant change [S320]. In particular, if the depth change value ($\Delta d_k$) of the object in the $k^{th}$ frame is smaller than 0 and the depth change value of the object in the $(k-1)^{th}$ frame is smaller than the negative $3^{rd}$ reference value ($T_3$) [S370], the depth change is determined as the significant change.

Through the above-described process, if the depth change value of the object is determined as the significant (valid) depth change, since at least one or more objects may exist in the image, it is determined whether to actually change a depth/distance level of the sound for which one of the determined objects [S130].

Figure 4:
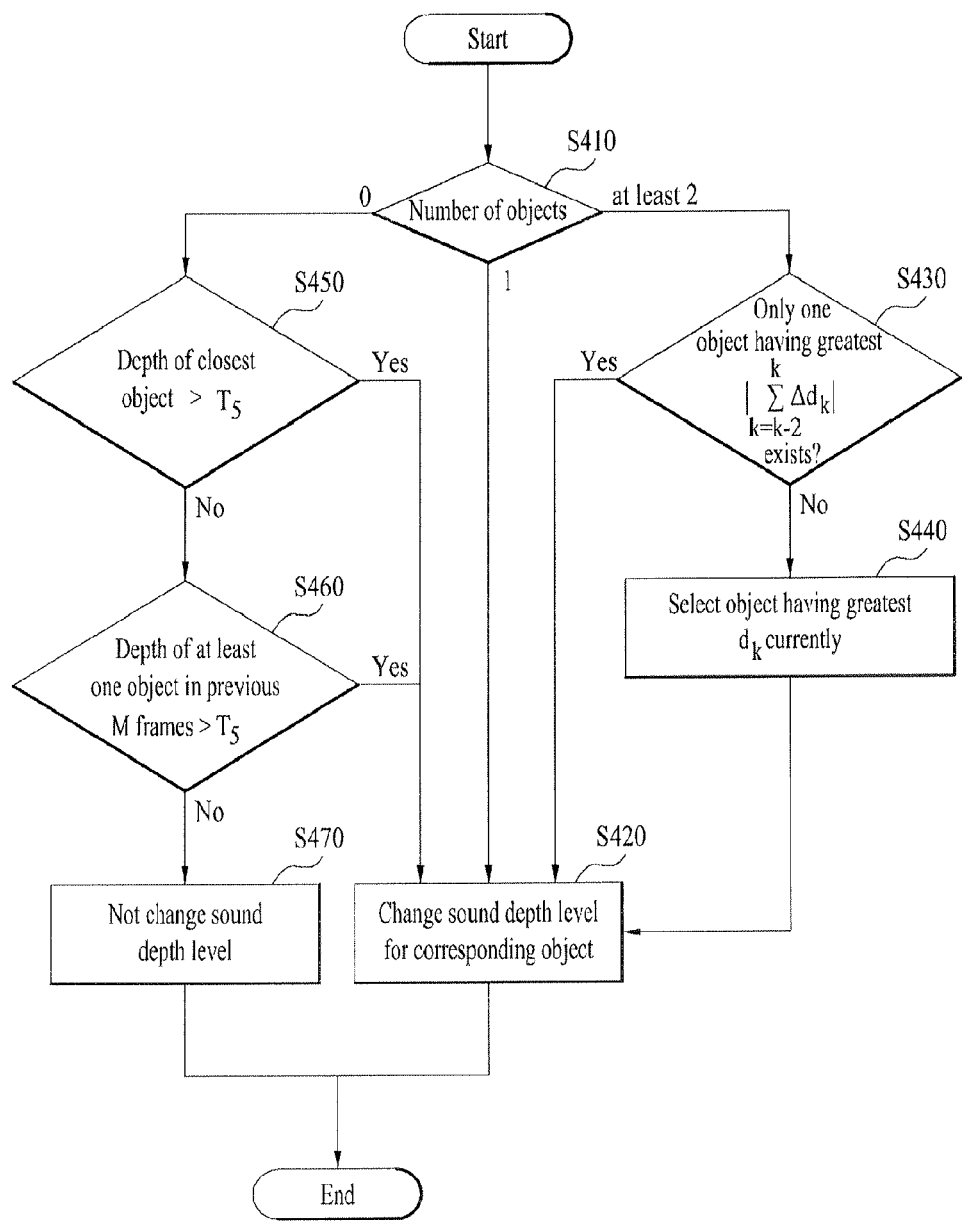
FIG. 4 is a flowchart for one example of a method of determining an object to change a depth level of sound.

FIG. 4 is a flowchart for one example of a method of selecting a target object to change a depth level of sound.

Referring to FIG. 4, first of all, the number of objects determined as significant (valid) depth changes is determined [S410]. If one object exists in a $k^{th}$ frame, a sound depth/distance level is determined and changed in accordance with a depth change value or a depth level of the corresponding object [S420].

If there are at least two determined objects, it is determined whether there is on object having a greatest absolute value of a sum of depth change values from a frame k to a frame k−2 [S430] and a sound depth/distance level for the corresponding object is then changed [S420]. If there are at least two objects each of which having an absolute value of a sum of the same depth change value, the object currently having the biggest depth change value is selected as a target object [S440] and a sound depth/distance level is then changed in accordance with a depth change value or a depth level of the selected object [S420].

Meanwhile, if there is no determined object, object proximity based level estimation is performed to determine whether to finally change a sound depth/distance level. In particular, referring to FIG. 4, it is determined whether an object having a depth change value greater than a $5^{th}$ reference value ($T_5$) exists among the objects existing in the current frame k [S450]. If the object having the depth change value greater than the $5^{th}$ reference value ($T_5$) exists, it is determined as a significant object and a depth/distance level is then changed into a stereoscopic sound effect level in accordance with a depth change value of the determined object [S420]. If there is no object having a sufficiently large depth change value among the objects existing in the current frame k, it is determined whether there is a case that a depth change value of at least one object is greater than the $5^{th}$ reference value ($T_5$) in intervals of previous M frames [S460]. If the case exists, a sound depth/distance level of the corresponding at least one object is changed [S420]. Otherwise, a sound depth/distance level is not changed into a final sound depth/distance level [S470]. Thus, if a sound depth/distance level of a prescribed proximate object appears, it may be able to secure a time for a listener to perceive a change of sound by maintaining the value during at least M frames.

Subsequently, based on the depth change value or the depth level of the object determined by the above-described method, a depth/distance level of the sound corresponding to the object is changed [S140]. In doing so, the sound depth/distance level may be changed by a uniform quantizing method of directly mapping a range of the detected depth change value or the detected depth level to a sound depth/distance level or a non-uniform quantizing method of assigning a sound depth/distance level differentially in accordance with a range of binocular disparity.

Figure 5:
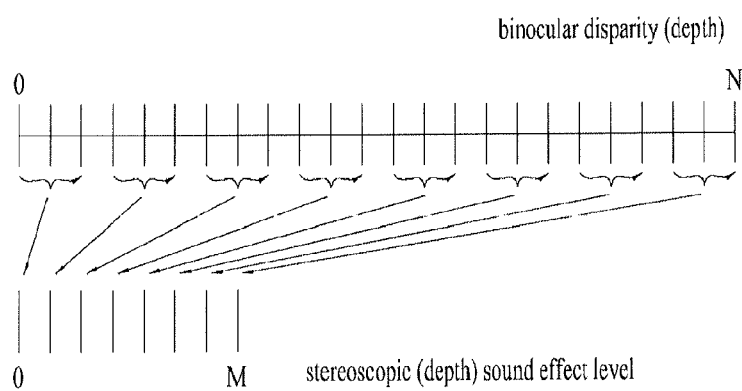
FIG. 5 is a diagram for a concept of calculating a depth level of sound by a uniform quantizing method.
Figure 6:
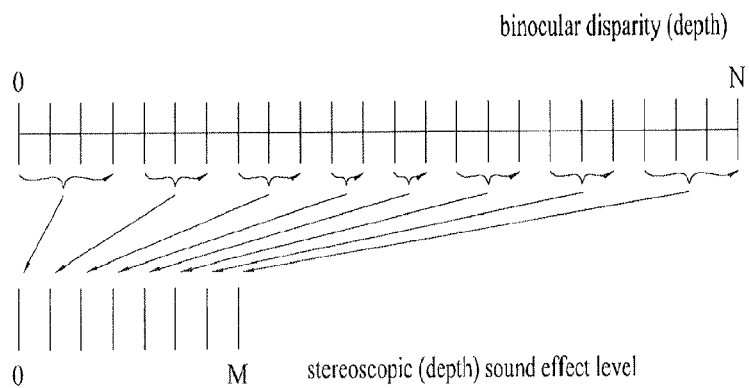
FIG. 6 is a diagram for a concept of calculating a depth level of sound by a non-uniform quantizing method.

FIG. 5 is a diagram for one example of changing binocular disparity levels into sound depth/distance levels by a uniform quantizing method. And, FIG. 6 is a diagram for one example of directly changing binocular disparity levels into sound depth/distance levels by a non-uniform quantizing method.

In a non-uniform quantizing method, depths of objects in very close or far distance are approximately quantized and depths of objects in middle rage are quantized relatively in detail. Hence, it may be able to assign a detailed sound level to a motion in an obscure range.

Figure 7:
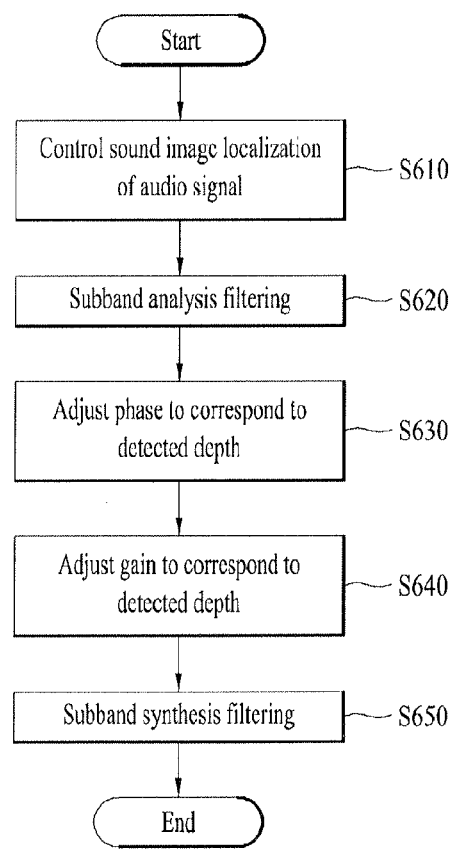
FIG. 7 is a flowchart for a method of applying a calculated depth level of sound to an audio signal.

Subsequently, an audio signal corresponding to the object is outputted in a manner of reflecting the depth/distance level of sound of the object [S140]. FIG. 7 is a detailed flowchart for a method of applying a depth/distance level of sound to an audio signal. This method is described in detail with reference to FIG. 7 as follows.

Referring to FIG. 7, first of all, sound image localization of an audio signal is controlled [S610]. In this case, the sound image localization means a location of a sound image perceived sensibly. For instance, in a stereo audio signal having a left channel and a right channel, if an audio signal of the left channel and an audio signal of the right channel are equal to each other, a sound image localization may be located at a center between a left speaker and a right speaker.

In a method of localizing a sound image, for example, based on a phase difference (or a time difference) and a level ratio (or a sound pressure level ratio) of a vocal signal arriving at each ear of a listener, a sound source can be sensed at a specific location (or in a specific direction) in a sound image space. For this sound image localization control, the present embodiment uses HRTF (head-related transfer function) filtering for a decoded audio signal that is inputted.

The HRTF (head-related transfer function) means a transfer function between a sound wave originating from a sound source at a random location and a sound wave arriving at the ear drum of an ear. And, the HRTF (head-related transfer function) can be acquired in a manner of inserting a microphone in an ear of an actual listener or a human-shaped ear model and then measuring an impulse response of an audio signal at a specific angle. A value of the HRTF (head-related transfer function) varies in accordance with a direction and altitude of a sound source. And, the value of the HRTF (head-related transfer function) may vary in accordance with such a body property of a listener as a head shape, a head size, an ear shape and the like.

According to an embodiment of the present invention, the HRTF (head-related transfer function) varies in accordance with a sound depth/distance level created to correspond to a depth of a stereoscopic image. For instance, assuming that a location of a sound source varies in accordance with a depth/distance level of sound, it may be able to set each HRTF (head-related transfer function) with reference to the sound source according to a corresponding depth. In particular, a coefficient of the HRTF (head-related transfer function) is determined in accordance with a depth/distance level of sound. Moreover, a coefficient of the HRTF (head-related transfer function) may vary per frequency. Specifically, if a depth/distance level of sound or a change value of the depth/distance level of the sound is increasingly raised, it may be able to perform coefficient adjustment of HRTF (head-related transfer function) to eliminate a high-frequency component.

Figure 8:
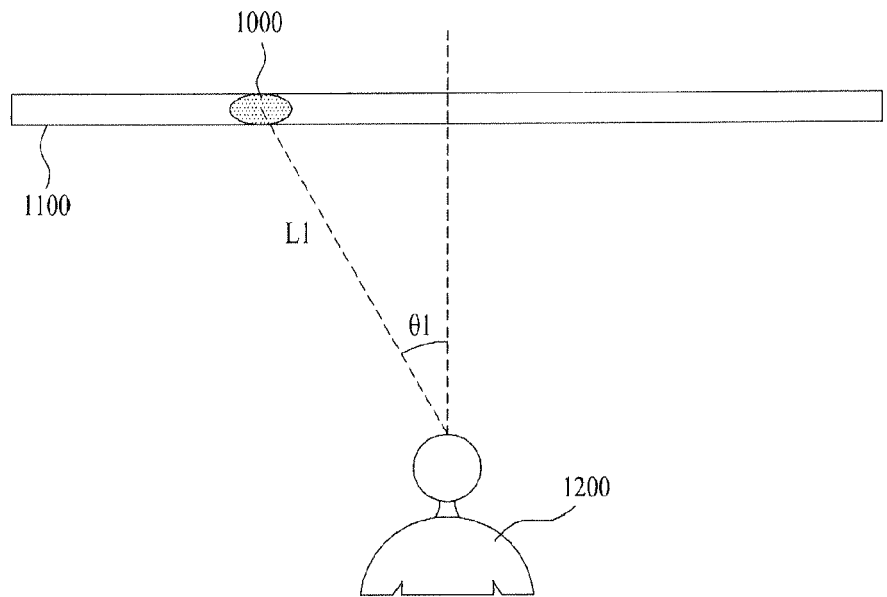
FIGS. 8 to 10 are schematic diagrams for a location relation between an object on an image and a viewer.
Figure 9:
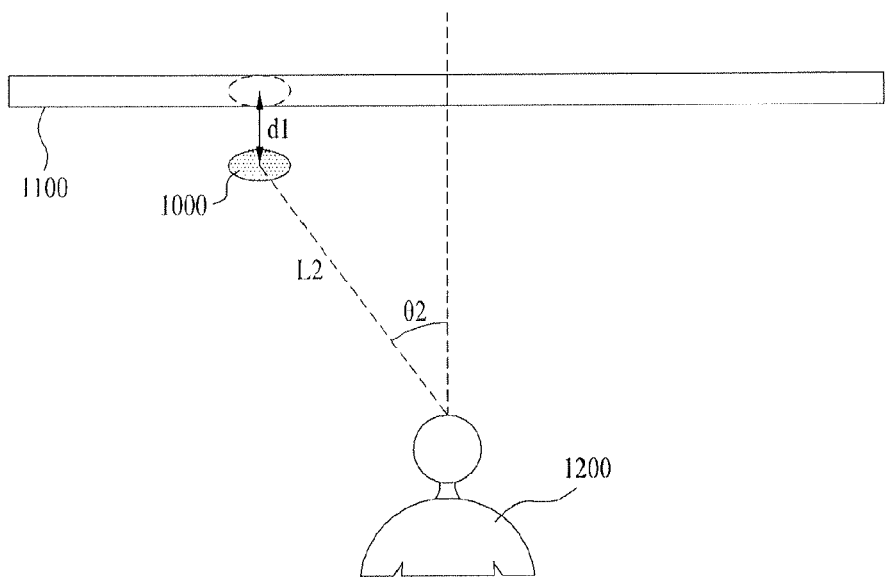
Figure 10:
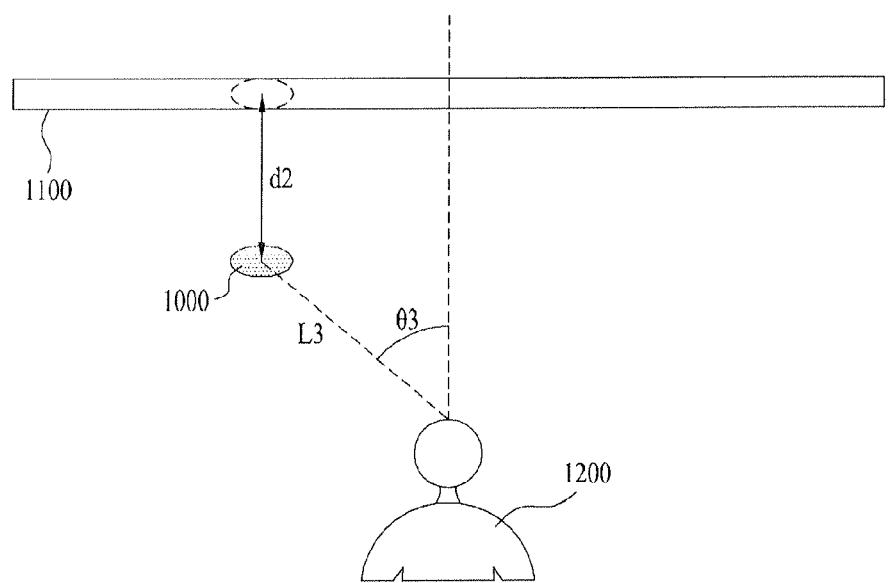

FIGS. 8 to 10 show examples of arranging an object 1000 in a screen 1100.

FIG. 8 shows a case that an object 1000 does not have a depth. Referring to FIG. 8, assuming that the object 1000 has a sound source, an angle between the sound source and a listener 1200 is set to θ1 and a distance between the sound source and the listener 1200 is set to L1.

FIG. 9 shows a case that an object 1000 has a depth d1 and that the object 1000 is projected from a screen 1100. Referring to FIG. 9, assuming that the object 1000 has a sound source, an angle between the sound source and a listener 1200 is set to θ2 and a distance between the sound source and the listener 1200 is set to L2.

FIG. 10 shows a case that an object 1000 has a depth d2 and that the object 1000 is farther projected from a screen 1100. Referring to FIG. 10, assuming that the object 1000 has a sound source, an angle between the sound source and a listener 1200 is set to θ3 and a distance between the sound source and the listener 1200 is set to L3.

Referring to FIGS. 8 to 10, the greater the depth of the object 1000 becomes, the smaller the distance between the object 1000 and the listener 1200 gets. Thus, if the object has different depths, HRTF (head-related transfer function) in accordance with a depth level corresponding to each of the different depths is prepared and HRTF filtering is performed. Therefore, a sound image localization method using HRTF (head-related transfer function) in accordance with a depth of a stereoscopic image is able to provide such a 3D effect as a sense of space, a sense of realism and the like.

Meanwhile, the HRTF (head-related transfer function) filtering may be performed on the basis of a mono channel. For instance, by performing convolution on a mono channel audio signal with an impulse response to a $1^{st}$ HRTF and an impulse response to a $2^{nd}$ HRTF, it is able to generate a left audio signal and a right audio signal. Hence, a sound image localization can be correspondingly performed.

Meanwhile, in case that a multi-channel audio signal is inputted, HRTF filtering is performed per channel, a left audio signal and a right audio signal are generated from each of the channels, and a sum of the left audio signals and a sum of the right audio signals may be then outputted.

Subsequently, subband analysis filtering is performed on the sound-image-localization controlled audio signal [S620]. In particular, the sound-image-localization controlled audio signal is converted to a frequency signal using a subband analysis filter bank. In this case, the number of subbands of the filtered audio signal may be 32 or 64.

Subsequently, a phase is adjusted per frequency band separated per band [S630]. This phase control may be performed on the basis of a depth/distance level of sound or a change value of the depth/distance level of the sound. Preferably, a phase may be increased in proportion to a depth/distance level of sound or a change value of the depth/distance level of the sound. When the phase is increased, it is possible to raise the phase to an upper limit. For instance, in case that a phase of an audio signal on a prescribed frequency is increased by 180 degrees, it may be observed that the corresponding audio signal is outputted in a manner of being further projected in user direction. Meanwhile, if a depth/distance level of sound or a change value of the depth/distance level of the sound is insignificant, i.e., if a depth/distance level of sound or a change value of the depth/distance level of the sound is smaller than a prescribed value, the phase control may not be performed.

The phase control method may be performed in various ways. For instance, an inter-channel code is changed by dividing a band for a specific frequency range only, an inter-channel code is changed by binding into a group for a specific frequency range, an inter-channel phase is independently adjusted on all frequency band, an inter-channel phase is adjusted by diving a band for a specific frequency range only, or an inter-channel phase is adjusted by binding into a group for a specific frequency range. Moreover, it may be able to perform phase control to eliminate a high-frequency component in proportion to a depth/distance level of sound or a change value of the depth/distance level of the sound.

Subsequently, a gain is adjusted per frequency band separated per band [S640]. This gain control may be performed on the basis of a detected depth/distance level of sound or a change value of the depth/distance level of the sound. Preferably, a phase may be increased in proportion to a detected depth/distance level of sound or a change value of the depth/distance level of the sound.

For instance, in case that a detected depth/distance level of sound is increased double, it may be able to increase a gain by four times. For another instance, in case that a detected depth/distance level of sound is increased by four times, it may be able to increase a gain by eight times. Hence, it may be able to emphasize a zooming-attempted band of an audio signal to correspond to the depth/distance level of the sound.

The gain control method may be performed in various ways. For instance, a gain is independently adjusted on all frequency band, a gain is adjusted by dividing a band for a specific frequency range only, or a gain is adjusted by binding into a group for a specific frequency range. For instance, if a frequency band ranged 1,000 Hz to 4,000 Hz, a gain is adjusted. Otherwise, a gain control may not be performed on the rest of the frequency band. Moreover, it may be able to perform gain control to eliminate a high-frequency component in proportion to a depth/distance level of sound or a change value of the depth/distance level of the sound.

Subsequently, subband synthesis filtering is performed on the audio signal of which phase or gain is adjusted per frequency band [S650]. In particular, using a subband synthesis filter bank, a plurality of subbands (e.g., 64 subbands, etc.) are synthesized together. Hence, an audio signal, on which the sound image localization, the phase control, the gain control and the like have been performed in accordance with depth/distance, is finally outputted. This audio signal is outputted by zooming in accordance with the depth/distance, thereby being perceived as if outputted in front of a listener's head.

Meanwhile, the sound image localization, the phase control, the gain control and the like in accordance with a depth/distance level of sound may be selectively performed. In particular, at least one of the sound image localization, the phase control, the gain control and the like may be performed in accordance with a depth/distance level of sound. For instance, the phase control corresponding to a depth/distance level of sound is performed only or the gain control corresponding to a depth/distance level of sound is performed only. Alternatively, on the assumption of the sound image localization in accordance with a depth/distance level of sound, the phase control or the depth adjustment may be selectively performed.

$2^{nd}$ Embodiment

In the following description, a method of controlling a depth/distance of sound according to a $2^{nd}$ embodiment of the present invention is explained in detail with reference to FIGS. 11 to 14.

Figure 11:
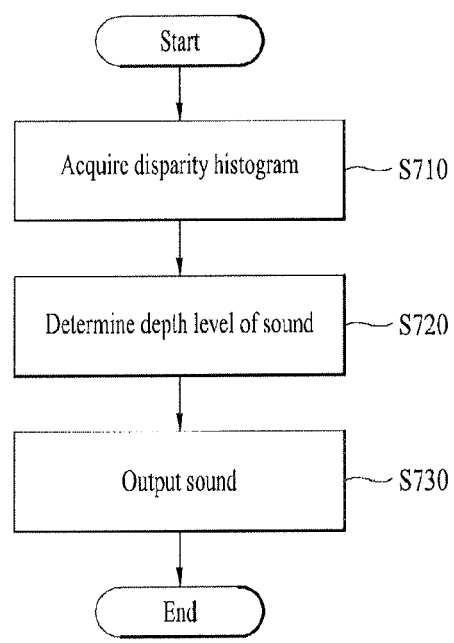
FIG. 11 is a flowchart for a method of controlling a depth of sound according to a $2^{nd}$ embodiment of the present invention.

FIG. 11 is a flowchart for a method of controlling a depth/distance of sound according to a $2^{nd}$ embodiment of the present invention.

Referring to FIG. 11, in a method of controlling a depth/distance of sound according to a $2^{nd}$ embodiment of the present invention, first of all, a disparity histogram indicating a weight per pixel/region in accordance with a depth/disparity is acquired from a binocular disparity image [S710].

Figure 12:
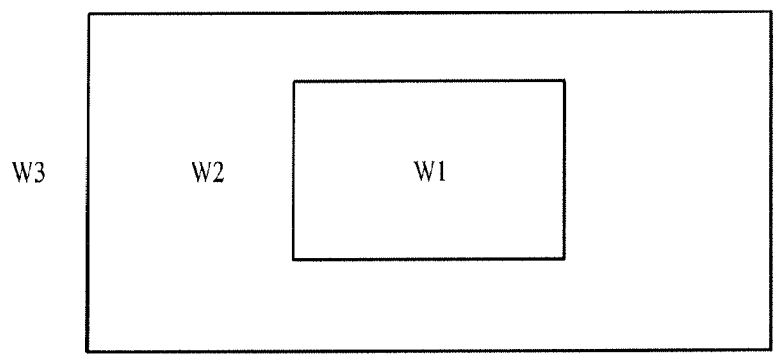
FIG. 12 is a schematic diagram for one example of a disparity map extracted in a $2^{nd}$ embodiment of the present invention.

For instance, a disparity map is extracted from a binocular disparity image, the extracted disparity map is divided into a plurality of screen regions w1 to w3, as shown in FIG. 12, and weights are then applied to a plurality of the screen regions, respectively. On the assumption that a center region of the screen is more important than the rest of the screen, the screen is divided into a center region w1, a middle region w2 and a peripheral region w3 and weights decreasing in order of the center region w1, the middle region w2 and the peripheral region w3 are applied to the corresponding regions w1 to w3, respectively, for example. This example is provided to describe the present invention and the screen may be divided in other ways.

Figure 13:
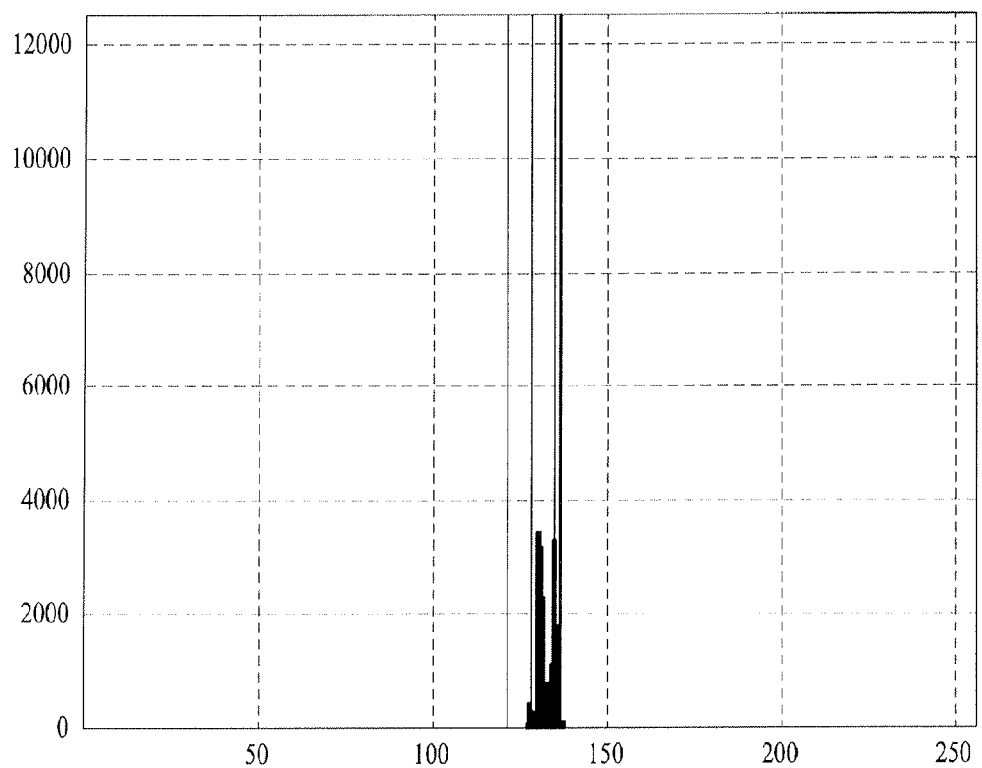
FIG. 13 is a schematic diagram for one example of a disparity histogram extracted in a $2^{nd}$ embodiment of the present invention.

FIG. 13 is a schematic diagram for one example of a disparity histogram, in which a weight is applied to each screen region in the above-mentioned manner. In FIG. 13, a horizontal axis of the histogram indicates a size of depth and a vertical axis indicates the number of pixels corresponding to a size of each depth.

Subsequently, based on the disparity histogram, the depth/distance level of the sound is determined [S720]. In doing so, referring to FIG. 14, a plurality of depth intervals in accordance with a size of depth is defined in the disparity histogram, a sum of the pixel numbers in a plurality of the defined depth intervals is found, and a depth/distance level of sound can be then determined to correspond to the sum of the pixel numbers in the depth intervals.

In particular, a disparity histogram per level interval is found in a manner of dividing a horizontal axis of all histogram intervals, i.e., an axis of depth as many as the number of desired levels equally or non-equally and then adding histograms in the respective level intervals together. Thereafter, the histogram of each depth interval (level) is compared to a threshold by starting with a depth interval (level) closest to a viewer in distance. If a histogram of a specific depth interval exceeds the threshold, it is determined that there is a stereoscopic effect at an object having a size equal to or greater than a predetermined size. It is then able to determine a depth/distance level of sound by the uniform quantizing method or the non-uniform quantizing method explained in the description of the $1^{st}$ embodiment of the present invention.

Subsequently, by reflecting the above-determined depth/distance level of the sound, the sound is outputted [S730]. In doing so, since a method of outputting the sound by reflecting the depth/distance level of the sound may be performed in the same manner as explained in the description of the $1^{st}$ embodiment of the present invention, its details shall be omitted in the following description.

$3^{rd}$ Embodiment

In the following description, a method of controlling a depth/distance of sound according to a $3^{rd}$ embodiment of the present invention is explained in detail with reference to FIGS. 15 to 18.

Figure 15:
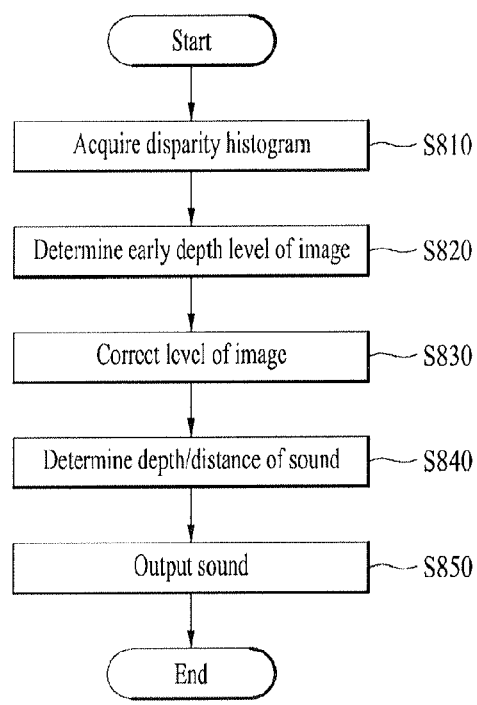
FIG. 15 is a flowchart for a method of controlling a depth of sound according to a $3^{rd}$ embodiment of the present invention.

FIG. 15 is a flowchart for a method of controlling a depth/distance of sound according to a $3^{rd}$ embodiment of the present invention.

Referring to FIG. 15, in a method of controlling a depth/distance of sound according to a $3^{rd}$ embodiment of the present invention, first of all, a disparity histogram indicating a weight per pixel/region in accordance with a depth/disparity is acquired from a binocular disparity image [S810]. The disparity histogram acquiring method is identical to the former acquiring method of the $2^{nd}$ embodiment of the present invention.

Figure 14:
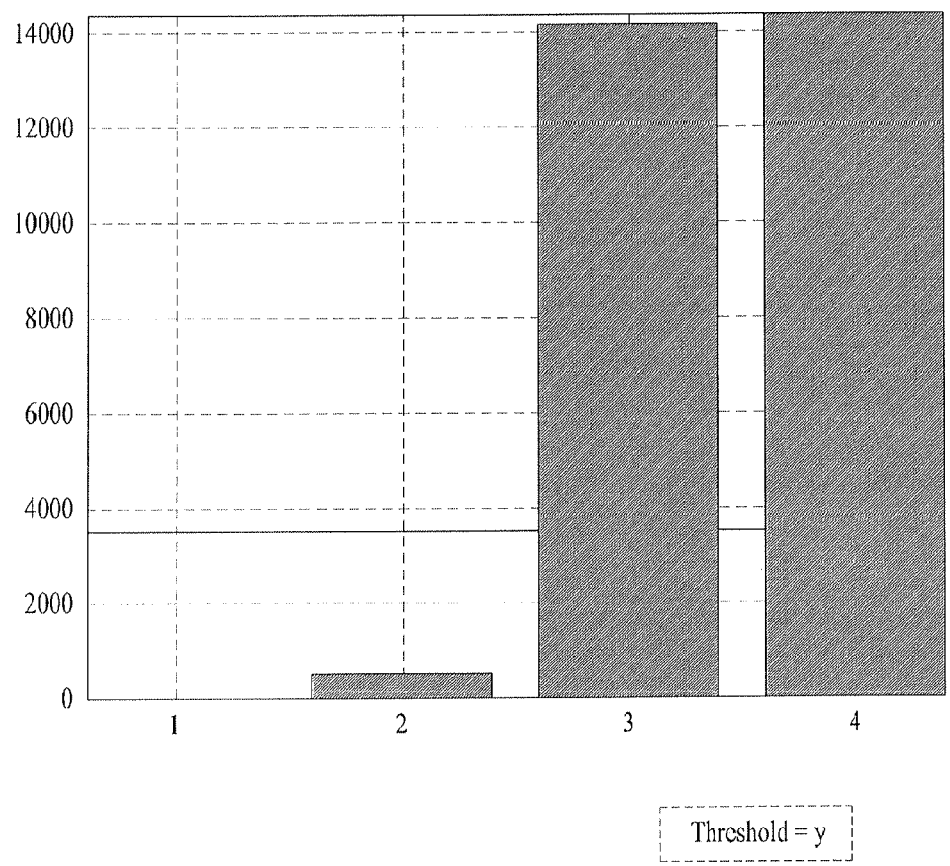
FIG. 14 is a schematic diagram for one example of a histogram defined as a disparity interval in a $2^{nd}$ embodiment of the present invention.

Subsequently, as shown in FIG. 14, a disparity histogram per level interval is found in a manner of dividing a horizontal axis of all histogram intervals, i.e., an axis of depth as many as the number of desired levels equally or non-equally and then adding histograms in the respective level intervals together. Thereafter, the histogram of each depth interval (level) is compared to a threshold by starting with a depth interval (level) closest to a viewer in distance. If a histogram of a specific depth interval exceeds the threshold, it is determined that there is a stereoscopic effect at an object having a size equal to or greater than a predetermined size. Thus, if it is determined that the corresponding object has the stereoscopic effect, an early depth level of an image is determined in accordance with a depth/disparity of a binocular disparity image [S820].

Yet, since the early depth level may include an error or a rapid level change, in case that a depth/distance level of sound is adjusted using the early depth level of the image, a viewer may be provided with confusing sound rather than stereoscopic sound. For instance, if detailed depth changes of an image in an interval having a short display time are entirely reflected in sound, a viewer may perceive the sound as awkward sound or nose. Therefore, in order to provide a best sound to a viewer, a step of correcting an early depth level of an image is necessary [S830]. The step of correcting the early depth level of the image may be applicable to the $1^{st}$ embodiment or the $2^{nd}$ embodiment as well as the $3^{rd}$ embodiment.

The present invention provides three kinds of early depth level correcting methods. These correcting methods may be applicable singly or in combination.

1. Level Correcting Method Through Short Frame Removal

This correcting method is a method of determining a final depth level using a frame depth level in a predetermined interval previously saved in accordance with a depth level change size/frequency of a current frame without reflecting all depth changes of an image in a short interval in sound. A level of an image may be corrected using the following methods A, B and C singly or in combination.

Method A

After an interval-average level has been found in a current frame k, it is compared to a final level of a previous frame (k−1). If the two levels are different from each other, i.e., if there is a level change in the current frame k, a change value (an absolute value D(k) of a level value difference between two contiguous frames frame (i) and frame (i−1) in a previous predetermined interval) of a previously saved frame depth level in a predetermined interval is compared to a threshold Th1. If the absolute value D(k) is greater than the threshold Th1, the final level of the previous frame (k−1) is determined as a final depth level of an image. Otherwise, i.e., if the absolute value D(k) is equal to or smaller than the threshold Th1, the interval-average level of the current frame k is determined as a final depth level of an image.

Method B

After an interval-average level has been found in a current frame k, it is compared to a final level of a previous frame (k−1). If the two levels are different from each other, i.e., if there is a level change in the current frame k, a change frequency C(k) of directionality in accordance with a direction change (a sign (+/−) change of a level value difference between two contiguous frames frame (i) and frame (i−1) in a previous predetermined interval) of a previously saved frame depth level in a predetermined interval is found. And, the change frequency C(k) is compared to a threshold Th2. If the change frequency C(k) is greater than the threshold Th2, the final level of the previous frame (k−1) is determined as a final depth level of an image. Otherwise, i.e., if the change frequency C(k) is equal to or smaller than the threshold Th1, the interval-average level of the current frame k is determined as a final depth level of an image.

Method C

After an interval-average level has been found in a current frame k, it is compared to a final level of a previous frame (k−1). If the two levels are different from each other, i.e., if there is a level change in the current frame k, a value D(k)*C(k) resulting from multiplying the absolute value D(k) of the method A by the change frequency C(k) of the method B is compared to a threshold Th3. If the value D(k)*C(k) of the multiplication is greater than the threshold Th3, the final level of the previous frame (k−1) is determined as a final depth level of an image. Otherwise, i.e., if the value D(k)*C(k) of the multiplication is equal to or smaller than the threshold Th3, the interval-average level of the current frame k is determined as a final depth level of an image. In the method C, both of the change size of the depth level and the change frequency of the depth level are reflected. Hence, it may be able to provide smooth sound to keep up with an object of an image quickly changing in a short interval.

2. Level Correcting Method Based on Accuracy of a Depth Image

Figure 16:
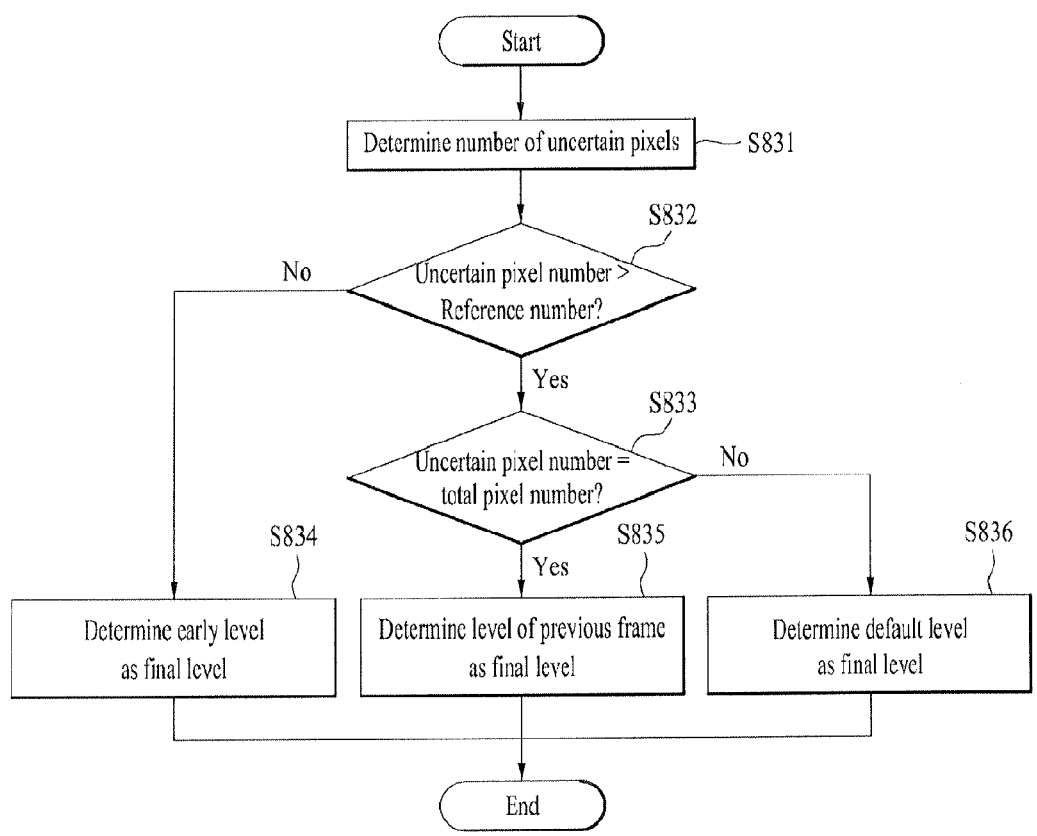
FIG. 16 is a flowchart for one example of a method of correcting an early depth level according to the present invention.

FIG. 16 is a flowchart for a level correcting method based on accuracy of a depth image. In case that right and left of a block in a disparity image fail to match, this block may be defined as an uncertain block. And, pixels included in this block may be defined a uncertain pixels. If a considerable number of uncertain blocks are detected from a current image, a depth image of the current image/frame may not be reliable. Hence, a default level value or a level value of a previous frame is determined as a final level of an image. Referring to FIG. 16, first of all, the number of uncertain pixels is determined [S831]. The determined number of the uncertain pixels is then compared to a reference number [S832]. If the determined number of the uncertain pixels is equal to or smaller than the reference number, an early depth level if determined as a final level of an image [S834]. Otherwise, it is determined whether the determined number of the uncertain pixels is equal to the total number of pixels [S833]. If the determined number of the uncertain pixels is different from (or smaller than) the total number of pixels, a previously determined default level is determined as a final level of the image [S836]. If the determined number of the uncertain pixels is equal to the total number of pixels, a level of a previous frame is determined as a final level of the image [S835].

3. Level Correcting Method Based on Histogram Concentration

Figure 17:
FIG. 17 is a diagram for an example of a histogram in accordance with a depth level of the present invention.
Figure 18:
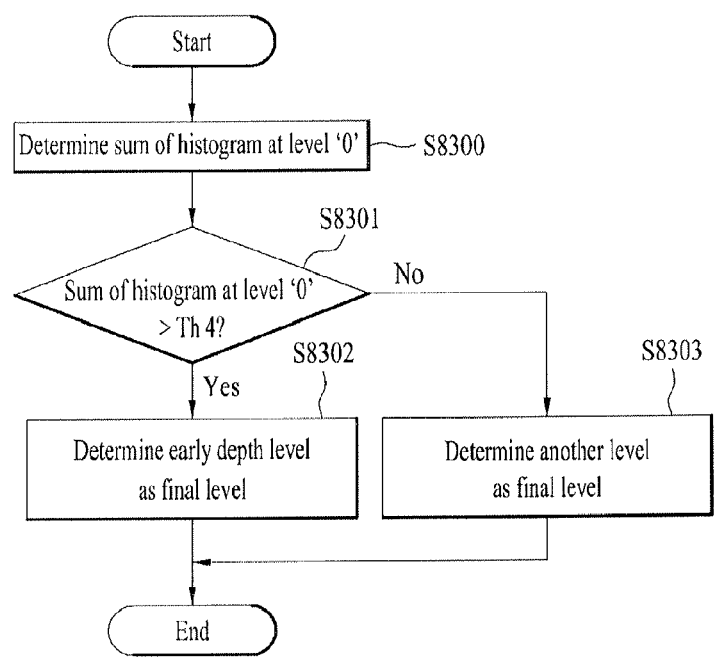
FIG. 18 is a flowchart for another example of a method of correcting an early depth level according to the present invention.

FIG. 17 is a diagram for an example of a histogram per level. And, FIG. 18 is a flowchart for a level correcting method based on histogram concentration. Referring to FIG. 18, a sum of histogram at a specific level, e.g., level '0' is determined [S8300]. It is determined whether the histogram sum at the level '0' is greater than a reference value Th4 or whether a rate of the histogram sum at the level '0' for a total histogram sum is greater than a threshold Th5 (e.g., 60%) [S8301]. If the histogram sum at the level '0' is greater than the reference value Th4 or whether the rate of the histogram sum at the level '0' for the total histogram sum is greater than the threshold Th5 (e.g., 60%), it is determined that a valid object exists at the level '0'. Hence, it is determined that a histogram value at the level '0' is valid and an early depth level is determined as a final level of an image [S8302]. On the contrary, if the histogram sum at the level '0' is smaller than the reference value Th4 or the rate of the histogram sum at the level '0' for the total histogram sum is smaller than the threshold Th5 (e.g., 60%), it is determined that a histogram value at the level '0' is not valid and another level value (e.g., a level of a previous frame, a preset level, etc.) is determined as a final level of the image [S8303].

Based on the above-determined final level of the image, a depth/distance level of sound corresponding to the image is changed [S840]. In doing so, the depth/distance level of the sound may be changed by the uniform quantizing method of directly mapping a range of a detected depth change value or a detected depth level to a depth/distance level value of sound or the non-uniform method of differentially assigning a depth/distance level value of sound in accordance with a range of binocular disparity.

Subsequently, sound is outputted in a manner of reflecting the above-determined depth/distance level of the sound [S850]. In doing so, the sound outputting method in consideration of the depth/distance level of the sound may be the same as explained in the description of the 1$^{st}$ embodiment of the present invention, of which details shall be omitted from the following description.

A sound depth controlling apparatus and an image display device having the sound depth controlling apparatus applied thereto according to an embodiment of the present invention are described in detail as follows.

Figure 19:
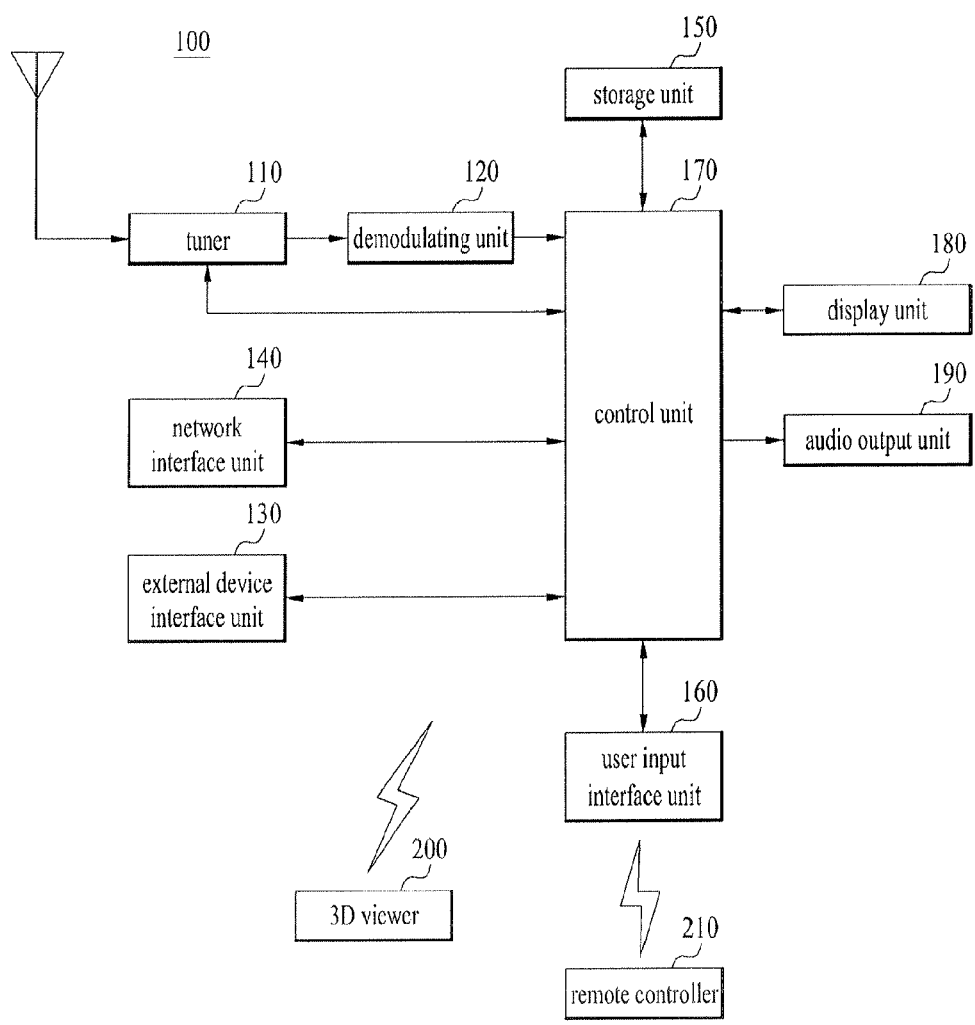
FIG. 19 is a block diagram for one example of an image display device to which an apparatus for controlling a depth of sound according to an embodiment of the present invention is applicable.

FIG. 19 is a block diagram for one example of an image display device to which an apparatus for controlling a depth of sound (hereinafter named a sound depth controller) according to an embodiment of the present invention is applicable.

Referring to FIG. 19, an image display device 100 may include a tuner 110, a demodulating unit 120, an external device interface unit 130, a network interface unit 140, a storage unit 150, a user input interface unit 160, a control unit 170, a display unit 180, an audio output unit 190, a 3D viewer 200 and a remote controller 210.

The tuner 110 selects an RF broadcast signal corresponding to a channel selected by a user or RF broadcast signals corresponding to all previously-saved channels from RF broadcast signals received via an antenna. And, the tuner 110 converts the selected RF broadcast signal to an intermediate frequency signal, an intermediate frequency signal or a baseband video or audio signal. For instance, if the selected RF broadcast signal is a digital broadcast signal, the tuner 110 converts the selected RF broadcast signal to a digital IF signal DIF. For another instance, if the selected RF broadcast signal is an analog broadcast signal, the tuner 110 converts the selected RF broadcast signal to an analog baseband video or audio signal CVBS/SIF. In particular, the tuner 110 may be able to process a digital broadcast signal or an analog broadcast signal. The analog baseband video or audio signal CVBS/SIF may be directly inputted to the control unit 170.

The tuner 110 may be able to receive an RF broadcast signal of a single carrier in accordance with ATSC (advanced television system committee) or an RF broadcast signal of a multi-carrier in accordance with DVB (digital video broadcasting). Meanwhile, according to the present invention, the tuner 110 sequentially selects RF broadcast signals on all broadcast channels saved by a channel memory function from the RF broadcast signals received via the antenna and may be then able to convert the sequentially selected RF broadcast signals to intermediate frequency signals, baseband video or audio signals.

The demodulating unit 120 receives the digital IF signal DIF converted by the tuner 110 and then performs a demodulation operation on the received signal. For instance, if the digital IF signal outputted from the tuner 110 follows ATSC, the demodulating unit 120 performs 8-VSB (7-vestigial side band) demodulation. And, the demodulating unit 120 may perform channel decoding as well. To this end, the demodulating unit 120 may include a trellis decoder, a de-interleaver, a Reed Solomon decoder and the like to perform trellis decoding, de-interleaving, Reed Solomon decoding and the like. For instance, if the digital IF signal outputted from the tuner 110 follows DVB, the demodulating unit 120 performs COFDMA (coded orthogonal frequency division modulation) demodulation. And, the demodulating unit 120 may be able to perform channel decoding. To this end, the demodulating unit 120 may include a convolution decoder, a de-interleaver, a Reed Solomon decoder and the like to perform convolution decoding, de-interleaving, Reed Solomon decoding and the like.

Having performed the demodulation and the channel decoding, the demodulating unit 120 may be able to output a stream signal TS. In this case, the stream signal may include a signal generated from multiplexing a video signal, an audio signal and/or a data signal together. For instance, the stream signal may include MPEG-2 TS (transport stream) in which MPEG-2 video signal, Dolby AC-3 audio signal and the like are multiplexed together. In particular, the MPEG-2 TS may include 4-byte header and 184-byte payload.

Optionally, the above-described demodulating unit 120 may be singly configured in accordance with ATSC or DVB. In particular, the demodulating unit 120 may include an ATSC demodulating unit and a DVB demodulating unit.

The stream signal outputted from the demodulating unit 120 is inputted to the control unit 170. The control unit 170 performs demultiplexing, video/audio signal processing and the like and then outputs a video and an audio to the display unit 180 and the audio output unit 190, respectively.

The external device interface unit 130 is configured to transceive data with an external device. To this end, the external device interface unit 130 may include an A/V input/output unit (not shown in the drawing) or a wireless communication unit (not shown in the drawing). For instance, the external device interface unit 130 may be connected by wire/wireless to such an external device as a DVD (digital versatile disk) player, a Blu-ray player, a game player, a camera, a camcorder, a computer (e.g., notebook, etc.) and the like. The external device interface unit 130 forwards video, audio and/or data signal externally inputted via the connected external device to the control unit 170 of the image display device 100. And, the external device interface unit 130 may be able to output video, audio and/or data signal processed by the control unit 170 to the connected external device. To this end, the external device interface unit 130 may include an A/V input/output unit (not shown in the drawing) or a wireless communication unit (not shown in the drawing). In this case, the A/V input/output unit may include USB terminal, CVBS (composite video banking sync) terminal, component terminal, S-video terminal (analog), DVI (digital visual interface) terminal, HDMI (high definition multimedia interface) terminal, RGB terminal, D-SUB terminal and the like to input video and audio signals of an external device to the image display device 100. And, the wireless communication unit may be configured to perform short-range communications with other electronic devices. In particular, the image display device 100 may be network-connected with other electronic devices by such a communication protocol as Bluetooth, RFID (Radio Frequency Identification), IrDA (infrared Data Association), UWB (Ultra Wideband), ZigBee, DLNA (Digital Living Network Alliance) and the like.

The external device interface unit 130 is connected with various settop boxes via at least one of the aforementioned terminals and is then able to perform input/output operations on the connected settop boxes. Besides, the external device interface unit 130 may be configured to transceive data with the 3D viewer 200.

The network interface unit 140 provides an interface to connect the image display device 100 with wire/wireless networks including internet network. The network interface unit 140 may be provided with an Ethernet terminal and the like for a connection with a wire network and may also be provided with a communication protocol terminal for a connection to a wireless network according to a communication protocol as WLAN (Wireless LAN) (Wi-Fi), Wibro (Wireless broadband), Wimax (World Interoperability for Microwave Access), HSDPA (High Speed Downlink Packet Access) and the like.

The network interface unit 140 is configured to receive contents or data, which are provided by an internet provider, a content provider and/or a network operator, via the connected network. In particular, the network interface unit 140 may be able to receive such a content provided by the internet provider, the content provider or the like as a movie, an advertisement, a game, a VOD, a broadcast signal and the like and information related to the content via the network. And, the network interface unit 140 may be able to receive update information of a firmware provided by the network operator and an update file of the firmware. Moreover, the network interface unit 140 may be able to transmit data to the internet provider, the content provider or the network operator.

The network interface unit 140 is connected to an IP (internet protocol) TV for example, receives a video, audio or data signal processed by an IPTV settop box, and forwards the receive signal to the control unit 170, to enable bidirectional communications. And, the network interface unit 140 is able to forward signals processed by the control unit 170 to the IPTV settop box. Meanwhile, the aforementioned IPTV may mean to include one of ADSL-TV, VDSL-TV, FTTH-TV and the like or may mean to include one of TV over DSL, Video over DSL, TV overIP (TVIP), Broadband TV (BTV) and the like.

The storage unit 150 may be able to store programs for processing and controlling various signals within the control unit 170 and may be also able to store signal-processed video, audio and/or data signals. The storage unit 150 may be able to perform a function of temporary storage of the video, audio and/or data signals inputted to the external device interface unit 130. And, storage unit 150 may be able to store information on a prescribed broadcast channel via such a channel memory function of a channel map or the like. Moreover, the storage unit 150 may be able to store a frame depth level for a predetermined interval used in the step of correcting an early depth level.

The storage unit 150 may include at least one storage medium selected from a flash memory type memory, a hard disk type memory, a multimedia card micro type memory, a card type memory (e.g., SD memory, XD memory, etc.), RAM, ROM (e.g., EEPROM, etc.) and the like. The image display device 100 plays back a file (e.g., a video file, a still image file, a music file, a document file, etc.) saved in the storage unit 150 and may then provide the played file to a user.

FIG. 19 shows that the storage unit 150 is configured separately from the control unit 170, by which the present invention is non-limited. Alternatively, the storage unit 150 may be configured to be included in the control unit 170.

The user input interface unit 160 forwards a signal inputted by a user to the control unit 170 or forwards a signal from the control unit 170 to the user. For instance, the user input interface unit 160 may receive such a user input signal as a power on/off, a channel selection, a screen setting and the like from the remote controller 210 or may transmit a signal from the control unit 170 to the remote controller 210, in accordance with one of various communication protocols including RF (radio frequency) communication protocol, IR (infrared) communication protocol and the like.

And, the user input interface unit 160 may be able to forward a user input signal, which is inputted by such a local key (not shown in the drawing) as a power key, a channel key, a volume key, a setting key and the like, to the control unit 170. Moreover, the user input interface unit 160 may forward a user input signal inputted by a sensing unit (not shown in the drawing) configured to sense a user's gesture to the control unit 170 or may transmit a signal from the control unit 170 to the sensing unit (not shown in the drawing). In this case, the sensing unit (not shown in the drawing) may include at least one of a touch sensor, a voice sensor, a position sensor, a motion sensor and the like.

The control unit 170 may be able to generate and output a signal for a video or audio output by demultiplexing a stream inputted via the tuner 110, the demodulating unit 120 or the external device interface unit 130 or processing the demultiplexed signals. The video signal video-processed by the control unit 170 may be inputted to the display unit 180 to be displayed as a video corresponding to the video signal. The video signal video-processed by the control unit 170 may be inputted to an external output device via the external device interface unit 130.

The audio signal processed by the control unit 170 may be inputted to the audio output unit 190 to be outputted as sound. The audio signal processed by the control unit 170 may be inputted to an external output device via the external device interface unit 130. Besides, the control unit 170 may include a demultiplexing unit (not shown in the drawing), a video processing unit (not shown in the drawing) and the like, which will be described later.

The control unit 170 may be able to control overall operations in the image display device 100. For instance, control unit 170 may be able to control the tuner 110 to be tuned to an RF broadcast corresponding to a user-selected channel or a previously saved channel. The control unit 170 may be able to control the image display device 100 by a user command inputted via the user input interface unit 160 or an inner program. For instance, the control unit 170 controls the tuner 110 to receive an input of a signal of a channel selected in accordance with a prescribed channel selection command received via the user input interface unit 160. The control unit 170 may then process a video, audio and/or data signal of the selected channel. The control unit 170 controls information on the user-selected channel and the like to be outputted via the display unit 180 and/or the audio output unit together with the processed video signal and/or the processed audio signal.

For another instance, the control unit 170 may control a video signal and/or an audio signal, which is inputted from an external device such as a camera, a camcorder and the like via the external device interface unit 130, to be outputted via the display unit 180 and/or the audio output unit 190 in accordance with an external device video play command received via the user input interface unit 160.

Meanwhile, the control unit 170 may be able to control the display unit 180 to display a video. For instance, the control unit 170 may be able to control the display unit 180 to display a broadcast video inputted via the tuner 110, an external input video inputted via the external device interface unit 130, a video inputted via the network interface unit 140 or a video saved in the storage unit 150. In doing so, the video displayed on the display unit 180 may include one of a still picture, a moving picture, a 2D image, a stereoscopic image and the like.

Meanwhile, the control unit 170 controls a prescribed object in an image displayed on the display unit 180 to be generated and displayed as a 3D object. For instance, the object may include at least one of an accessed web screen (e.g., newspaper, magazine, etc.), EPG (electronic program guide), menus, a widget, an icon, a still picture, a moving picture, a text and the like. This 3D object is processed to have a depth different from that of the image displayed on the display unit 180. Preferably, this 3D object may be processed to be seen in a manner of being projected over the image displayed on the display unit 180. In doing so, the control unit 170 includes a sound depth control unit, extracts an object from a stereoscopic image having a binocular disparity, determines a depth change of the object, coverts the depth change to a level of sound effect, and then outputs it to the audio output unit 190. This shall be described in detail later.

The display unit 180 generates a drive signal by converting a video signal, a data signal, an OSD signal, or a control signal, which is processed by the control unit. And, the display unit 180 generates a drive signal by converting a video signal, a data signal, a control signal and the like, each of which is received from the external device interface unit 130. The display unit 180 may include at least one of a PDP display, an LCD, an OLED display, a flexible display and the like, each of which is 3D displayable.

According to the embodiment of the present invention, the display unit 180 for the 3D image viewing may be configured by an additional display system or a single display system. According to the single display system, the display unit 180 is able to singly implement a stereoscopic image without a separate additional display such as glasses and the like. And, the single display system may include one of lenticular system, parallax barrier system and the like for example. Meanwhile, the additional display system is able to implement a stereoscopic image using an additional display as well as the display unit 180. For instance, the additional display system may include one of a head mount display (HMD) type, a glasses type and the like. The glasses type may be categorized into a passive system of a polarized glasses type or the like and an active system of a shutter-glass type or the like. Moreover, the head mount display type may be categorized into a passive system and an active system. Meanwhile, the display unit 180 may be useable as an input device as well as an output device in a manner of being configured with a touchscreen.

The audio output unit 190 receives an input of such a signal audio-processed by the control unit 170 as a stereo signal, a 3.1 channel signal, a 5.1 channel signal and the like and then outputs it as audio. And, the audio output unit 185 may be implemented with one of speakers of various types.

Meanwhile, in order to detect a user's gesture, as mentioned in the foregoing description, the sensing unit (not shown in the drawing) having at least one of a touch sensor, a voice sensor, a position sensor, a motion sensor and the like may be further provided to the image display device 100. A signal sensed by the sensing unit (not shown in the drawing) is forwarded to the control unit 170 via the user input interface unit 160.

The control unit 170 may be able to sense a user's gesture by combining at least one of an image taken via a photographing unit (not shown in the drawing) and a signal sensed by the sensing unit (not shown in the drawing).

The remote controller 210 transmits a user input to the user input interface unit 160. To this end, the remote controller 210 may be able to use at least one of Bluetooth, RF (radio frequency) communication, IR (infrared) communication, UWB (ultra wideband), ZigBee and the like. The remote controller 210 receives a video signal, an audio signal, a data signal and/or the like outputted from the user input interface unit 160 and then displays/outputs the received signal(s) on/to the remote controller 210.

The above-described image display device 100 may include a digital broadcast receiver capable of receiving at least one of an ATSC (7-VSB) digital broadcast, a DVB-T (COFDM) digital broadcast, an ISDB-T (BST-OFDM) digital broadcast and the like, as a stationary type. The image display device 100 may include a digital broadcast receiver capable of receiving at least one of a terrestrial DMB digital broadcast, a satellite DMB digital broadcast, an ATSC-M/H digital broadcast, a DVB-H (COFDM) digital broadcast, a MediaFLO (media forward link only) digital broadcast and the like, as a mobile type. And, the image display device 100 may include one of a cable digital broadcast receiver, a satellite communication digital broadcast receiver and an IPTV digital broadcast receiver.

Meanwhile, the image display device in the description of this specification may include at least one of a TV receiver set, a mobile phone, a smart phone, a notebook computer, a digital broadcast terminal, a PDA (personal digital assistants), a PMP (portable multimedia player) and the like.

Meanwhile, the image display device 100 shown in FIG. 19 is provided to implement the present invention for example and may be integrated, added or omitted entirely or in part. In particular, at least two components may be integrated into one or one component may be divided into at least two, for example of this configuration, if necessary. A function performed by each of the blocks shown in the drawing is provided to explain the embodiment of the present invention, of which detailed operation or device non-limits the scope of the appended claims and their equivalents.

Figure 20:
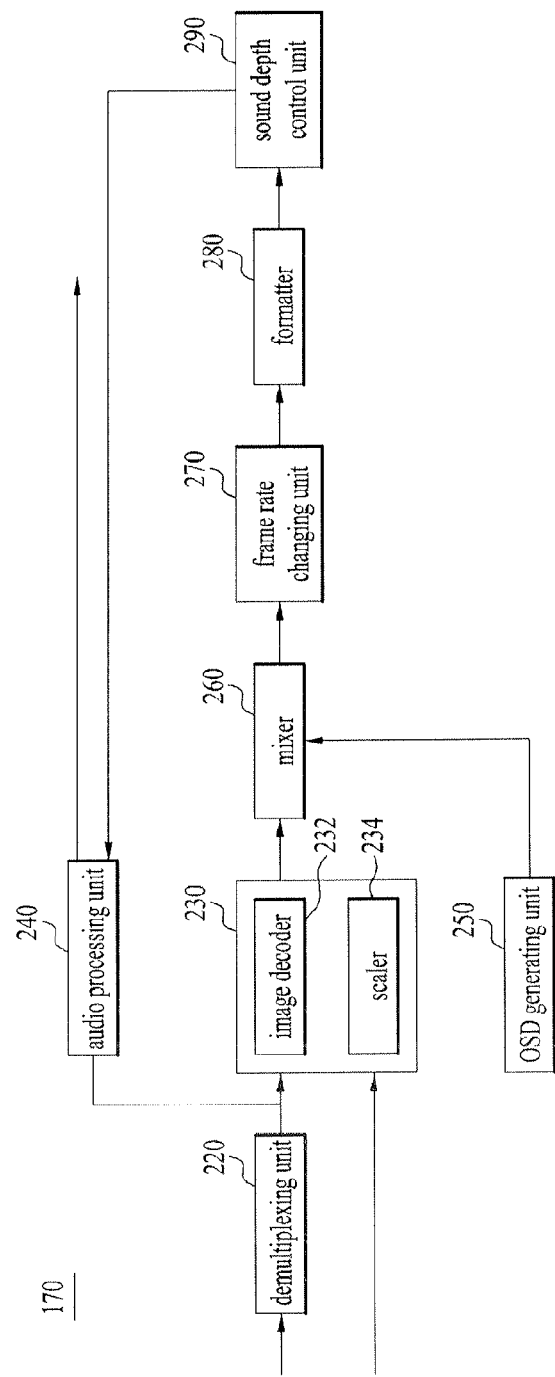
FIG. 20 is a block diagram of a control unit shown in FIG. 19.

FIG. 20 is a block diagram of the control unit 170 shown in FIG. 19.

Referring to FIG. 20, the control unit 170 may include a demultiplexing unit 220, a video processing unit 230, an audio processing unit 240, an OSD generating unit 250, a mixer 260, a frame rate converter 270, a formatter 280 and a sound depth control unit 290. And, the control unit 170 may further include a data processing unit (not shown in the drawing).

The demultiplexing unit 220 demultiplexes an inputted stream. For instance, if MPEG-2 TS is inputted, the demultiplexing unit 220 demultiplexes the inputted MPEG-2 TS to separate into a video signal, an audio signal and a data signal. In this case, the stream signal inputted to the demultiplexing unit 220 may include a stream signal outputted from the tuner 110, the demodulating unit 120 or the external device interface unit 130.

The video processing unit 230 may be able to perform video processing on the demultiplexed video signal. To this end, the video processing unit 230 may include a video decoder 232 and a scaler 234.

The video decoder 232 decodes the demultiplexed video signal and the scaler 234 performs scaling on resolution of the decoded video signal to be outputtable from the display unit 180. The video decoder 232 may be provided with decoders of various specifications. For instance, the video decoder 232 may include at least one of MPEG-2 decoder, H.264 decoder, MPEC-C decoder (MPEC-C part 3), MVC decoder, FTV decoder and the like. And, the video decoder 232 may further include a stereoscopic image decoder to decode a stereoscopic image signal. In this case, the demultiplexed video signal inputted to the stereoscopic image decoder may include MVC (multi-view video coding) coded video signal, a dual AVC coded video signal, or a signal having coded left and right eye image signals mixed therein for example.

As mentioned in the foregoing description, if the inputted signal is a signal having coded left and right eye image signals mixed therein, the 2D video decoder may be usable as it is. For instance, if the demultiplexed video signal is MPEG-2 coded video signal or AVC coded video signal, it may be decoded by the MPEG-2 decoder or the AVC decoder.

Meanwhile, the stereoscopic image decoder may further include a base view decoder and an extended view decoder as MVC decoders. For instance, if an extended view video signal in a coded stereoscopic image signal inputted to the stereoscopic image decoder is coded by MVC, it may be necessary to decode a corresponding base view video signal to decode the coded signal. To this end, the base view video signal decoded by the base view decoder is forwarded to the extended view decoder.

Consequently, the decoded stereoscopic image signal outputted from the stereoscopic image decoder may have a prescribed delay until the decoding by the extended view decoder is completed. Therefore, the decoded base view video signal and the decoded extended view video signal are outputted by being mixed with each other.

Moreover, for instance, if an extended view video signal in a coded stereoscopic image signal inputted to the stereoscopic image decoder is coded by AVC, unlike the aforementioned MVC case, an extended view video signal and a base view video signal can be decoded in parallel. Hence, the base view decoder and the extended view decoder may perform decoding operations independently. Meanwhile, the decoded base view video signal and the decoded extended view video signal are outputted by being mixed with each other.

Besides, unlike the drawing, the stereoscopic image decoder may include a color image decoder and a depth image decoder. In particular, if a stereoscopic image is coded in a manner of being divided into a color image and a depth image, in order to decode the divided images, the color image decoded may be able to decode the color image and the depth image decoder may be able to decode the depth image. In doing so, for the depth image decoding, it may be able to use the color image as a reference image.

Meanwhile, a video signal decoded by the video processing unit 230 may be categorized in accordance with a case that a 2D video signal exists only, a case that a 2D video signal and a stereoscopic image signal are mixed together, and a case that a stereoscopic image signal exists only. For instance, an external video signal inputted from an external device or a broadcast video signal of a broadcast signal received by the tuner 110 can be classified in accordance with a case that a 2D video signal exists only, a case that a 2D video signal and a stereoscopic image signal are mixed together, and a case that a stereoscopic image signal exists only. Hence, the corresponding video signal is signal-processed by the video processing unit 230 to be outputted as a 2D video signal, a mixed signal of a 2D video signal and a stereoscopic image signal or a stereoscopic image signal.

Meanwhile, a video signal decoded by the video processing unit 230 may include a stereoscopic image signal in one of various formats. For instance, the decoded video signal may include one of a stereoscopic image signal constructed with a color image and a depth image, a stereoscopic image signal constructed with a multi-view video signal, and the like. In this case, the multi-view video signal may include a left eye image signal and a right eye image signal for example. And, the format of the stereoscopic image signal may include one of a side-by-side format of arranging a left eye image signal L and a right eye image R at a left side and a right side, respectively, a top/down format of arranging a left eye image signal L and a right eye image R at a top side and a bottom side, respectively, a frame sequential format of arranging a left eye image signal L and a right eye image R by time division, an interlaced format of mixing a left eye image signal L and a right eye image R by line, and a checker box format of mixing a left eye image signal L and a right eye image R by box.

The OSD generating unit 250 generates an OSD signal by itself or in accordance with a user input. For instance, based on a user input signal, the OSD generating unit 250 generates a signal for displaying various information as graphic or text on a screen of the display unit 180. In this case, the generated OSD signal may include various data such as including a user interface screen of the image display device 100, various menu screens, widgets, icons and the like. And, the generated OSD signal may include a 2D or 3D object.

The mixer 260 mixes the OSD signal generated by the OSD generating unit 250 and the decoded video signal video-processed by the video processing unit 230 with each other. In doing so, each of the OSD signal and the decoded video signal may include at least one of a 2D signal and a 3D signal. The mixed video signal is then provided to the frame rate converter 270.

The frame rate converter (FRC) 270 converts a frame rate of an inputted video. For instance, the frame rate converter 270 may convert a frame rate of 60 Hz to 120 Hz or 240 Hz. In case that the frame rate is converted to 120 Hz from 60 Hz, a $1^{st}$ frame may be inserted between the $1^{st}$ frame and a $2^{nd}$ frame or a $3^{rd}$ frame predicted from the $1^{st}$ frame and the $2^{nd}$ frame may be inserted between the $1^{st}$ frame and the $2^{nd}$ frame. In case that the frame rate is converted to 240 Hz from 60 Hz, 3 identical frames may be further inserted or 3 predicted frame may be inserted.

Meanwhile, the above-described frame rate converter 270 may output an inputted frame rate intactly without a separate frame rate conversion. Preferably, in case that a 2D video signal is inputted, the frame rate converter 270 may be able to output a frame rate as it is. Meanwhile, in case that a stereoscopic image signal is inputted, it may be able to vary a frame rate as mentioned in the foregoing description.

The formatter 280 receives the signal mixed by the mixer 260, i.e., the OSD signal and the decoded video signal and then separates a 2D video signal and a stereoscopic image signal from each other. Meanwhile, the formatter 280 may be able to change a format of the stereoscopic image signal. For instance, the formatter 280 may be able to change a format of a stereoscopic image signal into one of a side-by-side format, a top/down format, a frame sequential format, an interlaced format, and a checker box format.

The formatter 280 may convert a 2D video signal to a stereoscopic image signal. For instance, in accordance with a stereoscopic image generating algorithm, the formatter 280 detects an edge or a selectable object from the 2D video signal and may be then able generate a stereoscopic image signal by separating an object according to the detected edge or the selectable object from the 2D video signal. In this case, the generated stereoscopic image signal may be arranged by being separated into a left eye image signal and a right eye image signal.

The sound depth control unit 290 determines a level of a sound effect by determining a depth change of an object in a binocular disparity image outputted from the formatter 280 and then outputs the determined level to the audio processing unit 240. In this case, the binocular disparity image means an image in which each pixel has a different level value in accordance with an extent or depth of disparity between left and right images.

Figure 21:
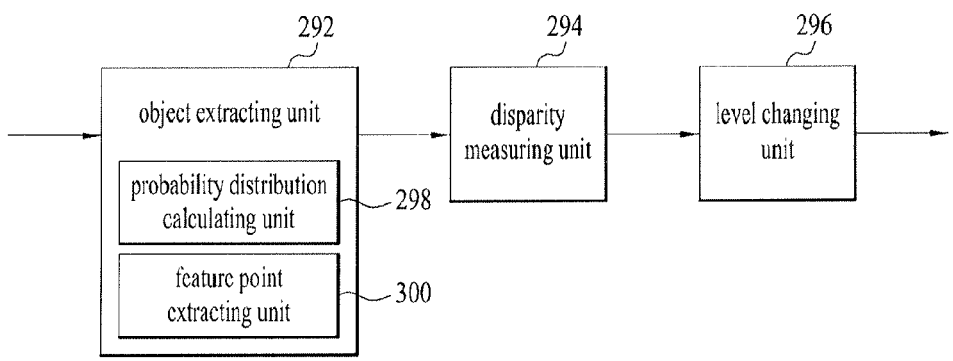
FIG. 21 is a block diagram for one example of a sound depth control unit shown in FIG. 20.

FIG. 21 is a block diagram for one example of the sound depth control unit 290 shown in FIG. 20.

Referring to FIG. 21, the sound depth control unit 290 may include an object extracting unit 292 extracting an object from a disparity image, a disparity measuring unit 294 acquiring a depth change value according to a motion of an object in the disparity image and determining whether to change a depth value into a depth level of sound, and a level changing unit 296 changing the depth value into the depth level of the sound.

The object extracting unit 292 extracts an object existing in an image using the disparity image. Through this, a background region and a thing are discriminated from each other and an analysis target can be then simplified by removing an unnecessary thing. In this case, the object extracting unit 292 may include a probability distribution calculating unit 298 extracting an object by probability distribution calculation and a feature point extracting unit 300 extracting an object by feature point extraction. According to the present invention, it may be able to extract an object more accurately using at least one of the probability distribution calculation and the distinctive feature point extraction selectively or interchangeably in consideration of a type of an input image and complexity of the corresponding calculation.

Although the probability distribution calculating unit 298 may basically use a histogram, its performance can be enhanced in a manner of applying various probability models suitable for property of an image or estimating probability distribution.

The feature point extracting unit 300 extracts an object in a manner of detecting an edge of an image and the like and then extracting an outline of one body or a feature unchangeable by rotation or size of the body based on the detected edge and the like.

The disparity measuring unit 294 measures a change value of depth information in accordance with a motion of the object extracted by the object extracting unit 292 between frames in a manner of tracking the motion of the extracted object by frame unit. For instance, if an inputted stereoscopic image is encoded into a color image and a depth image by being coded by MPEG-C Part 3, it may be able to calculate a depth of an object from an image decoded by the video processing unit 220.

For another instance, if an inputted stereoscopic image is encoded into a left eye image and a right eye image by being coded by MPEG-2 or the like, the left and right eye images are decoded and a depth of an object may be then calculated from information on a different angle of vision of the left and right eye images.

Meanwhile, the disparity measuring unit 294 determines whether to convert a disparity change of an object to a depth level of stereoscopic sound. In particular, the disparity measuring unit 294 determines a presence or non-presence of a significant depth change among depth changes of objects and then controls a depth change of a specific object to be reflected in a depth level of sound only. In doing so, a detailed determining method is as good as the former method described with reference to FIGS. 2 to 4 and the above-described determining method may be processed by the disparity measuring unit 294.

In case that the disparity measuring unit 294 determines to have a depth change of an image converted to a sound effect level, the level changing unit 296 changes a binocular depth level of an image measured by the disparity measuring unit 294 into a depth level of sound. The level changing unit 296 changes a level value necessary for sound in accordance with a depth change value by a motion of an object. In doing so, the level changing unit 296 may be able to changes a depth level of sound by a uniform quantizing method of directly mapping a range of the detected depth value to a depth level value of sound or a non-uniform quantizing method of assigning a depth level value of sound differentially in accordance with a range of binocular disparity. As mentioned in the foregoing description, in the non-uniform quantizing method, depths of objects in very close or far distance are approximately quantized and depths of objects in middle rage are quantized relatively in detail. Hence, it may be able to assign a detailed sound level to a motion in an obscure range.

Meanwhile, the disparity measuring unit 294 creates a disparity histogram indicating the number of pixels according to a disparity from a disparity image and the level changing unit 296 may determine a depth level of sound based on the disparity histogram. In doing so, the disparity measuring unit 294 divides the disparity image, i.e., a disparity map into a plurality of regions, applies weights to a plurality of the regions, respectively, and may be then able to find a disparity histogram in accordance with the weights. For instance, the disparity measuring unit 294 extracts a disparity map from a disparity image, divides the extracted disparity map into a plurality of screen regions w1 to w3, as shown in FIG. 12, and then applies weights to a plurality of the screen regions, respectively. In doing so, on the assumption that a center region of the screen is more important than the rest of the screen, the screen is divided into a center region w1, a middle region w2 and a peripheral region w3 and weights decreasing in order of the center region w1, the middle region w2 and the peripheral region w3 are applied to the corresponding regions w1 to w3, respectively, for example. This example is provided to describe the present invention and the screen may be divided in other ways.

FIG. 13 is a schematic diagram for one example of a disparity histogram, in which a weight is applied to each screen region in the above-mentioned manner. In FIG. 13, a horizontal axis of the histogram indicates a size of depth and a vertical axis indicates the number of pixels corresponding to a size of each depth.

The level changing unit 296 determines a depth level of sound based on the disparity histogram. In doing so, referring to FIG. 14, the level changing unit 296 defines a plurality of disparity intervals in accordance with a size of disparity in the disparity histogram, finds a sum of the pixel numbers in a plurality of the defined disparity intervals, and may be then able to determine a depth level of sound to correspond to the sum of the pixel numbers in the disparity intervals. In particular, a disparity histogram per level interval is found in a manner of dividing a horizontal axis of all histogram intervals, i.e., a disparity axis as many as the number of desired levels equally or non-equally and then adding histograms in the respective level intervals together. If a histogram of a corresponding disparity interval from a disparity interval close to a viewer exceeds a threshold, it is determined that there is a stereoscopic effect at an object having a size equal to or greater than a predetermined size. It is then able to determine a depth level of sound correspondingly.

Figure 22:
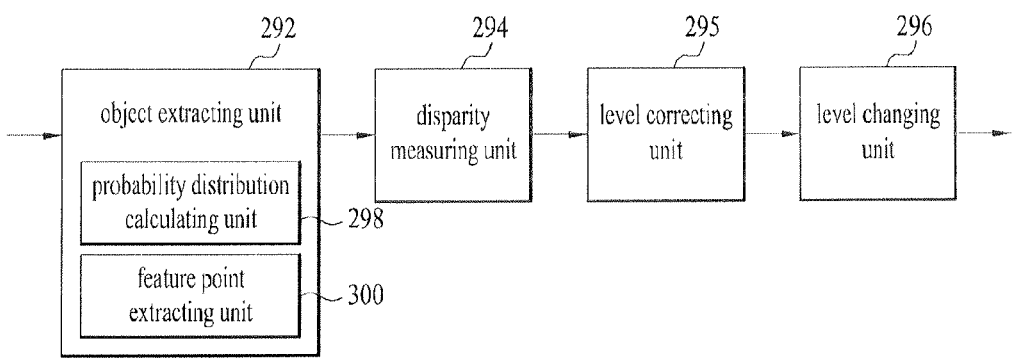
FIG. 22 is a block diagram for another example of a sound depth control unit shown in FIG. 20.

FIG. 22 is a block diagram for another example of the sound depth control unit 290. The sound depth control unit 290 shown in FIG. 22 is equal to the former sound depth control unit shown in FIG. 21 but differs from the former sound depth control unit shown in FIG. 21 in the following. The disparity measuring unit 294 is further provided with a function of determining an early depth level of an image based on a disparity histogram. In order to provide best sound to a viewer, a level correcting unit 295 is further included to correct an early depth level of an image. The level correcting unit 295 executes the three kinds of the early depth level correcting methods mentioned in the foregoing description singly or in combination and then outputs a final corrected level.

Figure 23:
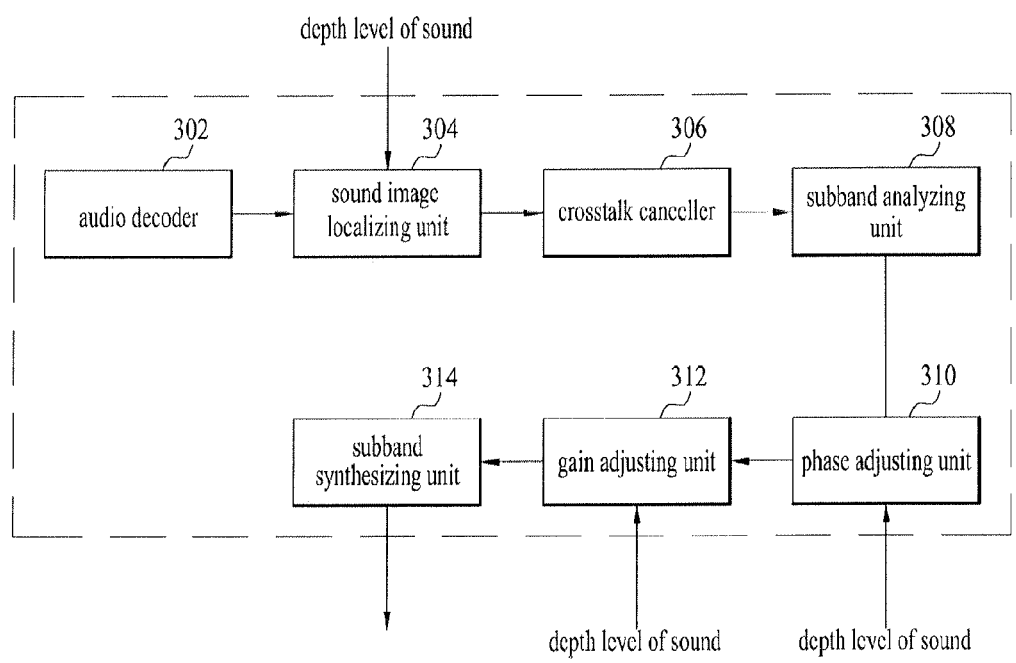
FIG. 23 is a block diagram of an audio processing unit shown in FIG. 23.

The audio processing unit 240 may be able to perform audio processing on a demultiplexed audio signal. To this end, referring to FIG. 23, the audio processing unit 240 may include an audio decoder 302, a sound image localizing unit 304, a crosstalk canceller 306, a subband analysis unit 308, a frequency dependent phase controller 310, a frequency dependent gain controller 312 and a subband synthesis unit 314.

The audio decoder 302 may be provided with various decoders to decode audio signals coded by various schemes. For instance, if a demultiplexed audio signal is MPEG-2 coded audio signal, it can be decoded by MPEG-2 decoder. If a demultiplexed audio signal is MPEG 4 BSAC (bit sliced arithmetic coding) coded audio signal according to terrestrial DMB (digital multimedia broadcasting), it can be decoded by MPEG-4 decoder. If a demultiplexed audio signal is MPEG 2 AAC (advanced audio codec) coded audio signal according to satellite DMB or DVB-H, it can be decoded by AAC decoder. If a demultiplexed audio signal is Dolby AC-3 coded audio signal, it can be decoded by AC-3 decoder.

The sound image localizing unit 304 controls sound image localization of an inputted decoded audio signal. In this case, the sound image localization means a location of a sound image perceived sensibly. For instance, in a stereo audio signal having a left channel and a right channel, if an audio signal of the left channel and an audio signal of the right channel are equal to each other, a sound image localization may be located at a center between a left speaker and a right speaker.

In a method of localizing a sound image, for example, based on a phase difference (or a time difference) and a level ratio (or a sound pressure level ratio) of a vocal signal arriving at each ear of a listener, a sound source can be sensed at a specific location (or in a specific direction) in a sound field space.

For this sound image localization control, the present embodiment uses HRTF (head-related transfer function) filtering for a decoded audio signal that is inputted. The HRTF (head-related transfer function) means a transfer function between a sound wave originating from a sound source at a random location and a sound wave arriving at the ear drum of an ear. And, the HRTF (head-related transfer function) can be acquired in a manner of inserting a microphone in an ear of an actual listener or a human-shaped ear model and then measuring an impulse response of an audio signal at a specific angle.

A value of the HRTF (head-related transfer function) varies in accordance with a direction and altitude of a sound source. And, the value of the HRTF (head-related transfer function) may vary in accordance with such a body property of a listener as a head shape, a head size, an ear shape and the like.

Meanwhile, according to an embodiment of the present invention, the HRTF (head-related transfer function) varies in accordance with a sound depth level of sound created to correspond to a depth of a stereoscopic image. For instance, assuming that a location of a sound source varies in accordance with a depth level of sound, it may be able to set each HRTF (head-related transfer function) with reference to the sound source according to a corresponding depth. In particular, a coefficient of the HRTF (head-related transfer function) is determined in accordance with a depth level of sound. Moreover, a coefficient of the HRTF (head-related transfer function) may vary per frequency. Specifically, if a depth level of sound or a change value of the depth level of the sound is increasingly raised, it may be able to perform coefficient adjustment of HRTF (head-related transfer function) to eliminate a high-frequency component.

Meanwhile, HRTF (head-related transfer function) according to a depth level of sound or coefficient information of HRTF (head-related transfer function) may be saved in the storage unit 150. Thus, the sound image localization using HRTF (head-related transfer function) in accordance with a depth of a stereoscopic image provides such 3D effect as a sense of space, a sense of realism and the like.

Meanwhile, the HRTF (head-related transfer function) filtering may be performed on the basis of a mono channel. For instance, by performing convolution on a mono channel audio signal with an impulse response to a $1^{st}$ HRTF and an impulse response to a $2^{nd}$ HRTF, it is able to generate a left audio signal and a right audio signal. Hence, sound image localization can be correspondingly performed.

Meanwhile, in case that a multi-channel audio signal is inputted, HRTF filtering is performed per channel, a left audio signal and a right audio signal are generated from each of the channels, and a sum of the left audio signals and a sum of the right audio signals may be then outputted.

The crosstalk canceller 306 performs signal processing for cancellation of crosstalk of a sound image localization controlled audio signal. In particular, in order to prevent a crosstalk phenomenon, in which a direction of a virtual sound source is not perceivable as a sound supposed to arrive at a left ear by operation processing arrives at a right ear, an additional audio signal can be transmitted. For instance, the crosstalk canceller 306 may be able to add a plurality of reverberation components, each of which has a delay time, to a difference signal between an audio signal of a right channel and an audio signal of a left channel. Hence, the left audio signal and the right audio signal pass through the crosstalk canceller 306 and can be then heard only via a left ear and a right ear of a listener, respectively.

Meanwhile, the signal processing for the crosstalk cancellation is performed based on a time domain, by which the present invention is non-limited. Alternatively, the signal processing for the crosstalk cancellation may be performed based on a frequency domain. In particular, a left audio signal and a right audio signal outputted from the image localizing unit 420 can be directly inputted to the subband analysis unit 308.

The subband analysis unit 308 performs subband analysis filtering on the sound image localization controlled audio signal. In particular, the subband analysis unit 308 is provided with a subband analysis filter bank and then converts the sound image localization controlled audio signal to a frequency signal. In this case, the number of subbands of the audio signal filtered by the subband analysis unit 308 may amount to 32 or 64. Thus, the audio signal divided per frequency band may be phase controlled or gain controlled per frequency band or frequency band group by the frequency dependent phase controller 310 and the frequency dependent gain controller 312.

The frequency dependent phase controller 310 controls or adjusts a phase per frequency band separated per band. This phase control may be performed on the basis of a depth level of sound or a change value of the depth level of the sound. Preferably, a phase may be increased in proportion to a depth level of sound or a change value of the depth level of the sound. When the phase is increased, it is possible to raise the phase to an upper limit. Meanwhile, if a depth level of sound or a change value of the depth level of the sound is insignificant, i.e., if a depth level of sound or a change value of the depth level of the sound is smaller than a prescribed value, the phase control may not be performed. For instance, in case that a phase of an audio signal on a prescribed frequency is increased by 180 degrees, it may be observed that the corresponding audio signal is outputted in a manner of being further projected in user direction.

The phase control method may be performed in various ways. For instance, an inter-channel code is changed by dividing a band for a specific frequency range only, an inter-channel code is changed by binding into a group for a specific frequency range, an inter-channel phase is independently adjusted on all frequency band, an inter-channel phase is adjusted by diving a band for a specific frequency range only, or an inter-channel phase is adjusted by binding into a group for a specific frequency range. Moreover, it may be able to perform phase control to eliminate a high-frequency component in proportion to a depth level of sound or a change value of the depth level of the sound.

The frequency dependent gain controller 312 control or adjusts a gain per frequency band separated per band. This gain control may be performed on the basis of a detected depth level of sound or a change value of the depth level of the sound. Preferably, a phase may be increased in proportion to a detected depth level of sound or a change value of the depth level of the sound. For instance, in case that a detected depth level of sound is increased double, it may be able to increase a gain by four times. For another instance, in case that a detected depth level of sound is increased by four times, it may be able to increase a gain by eight times. Hence, it may be able to emphasize a zooming-attempted band of an audio signal to correspond to the depth level of the sound.

The gain control method may be performed in various ways. For instance, a gain is independently adjusted on all frequency bands, a gain is adjusted by dividing a band for a specific frequency range only, or a gain is adjusted by binding into a group for a specific frequency range. For instance, if a frequency band ranged 1,000 Hz to 4,000 Hz, a gain is adjusted. Otherwise, a gain control may not be performed on the rest of the frequency band. Moreover, it may be able to perform gain control to eliminate a high-frequency component in proportion to a depth level of sound or a change value of the depth level of the sound.

The subband synthesis unit 314 performs subband synthesis filtering on the audio signal of which phase or gain is controlled per frequency band. In particular, using a subband synthesis filter bank, a plurality of subbands (e.g., subbands, 64 subbands, etc.) are synthesized together. Hence, an audio signal, on which the sound image localization, the phase control, the gain control and the like have been performed in accordance with depth, is finally outputted. This audio signal is outputted by zooming in accordance with the depth, thereby being perceived by a listener as if outputted in front of a listener's head.

Meanwhile, the sound image localization, the phase control, the gain control and the like in accordance with a depth level of sound may be selectively performed. In particular, at least one of the sound image localization, the phase control, the gain control and the like may be performed in accordance with a depth level of sound. For instance, the phase control corresponding to a depth level of sound is performed only or the gain control corresponding to a depth level of sound is performed only. Alternatively, on the assumption of the sound image localization in accordance with a depth level of sound, the phase control or the depth adjustment may be selectively performed.

Meanwhile, a channel separating unit (not shown in the drawing) may be provided between the audio decoder 302 and the sound image localizing unit 304.

The channel separating unit separates an inputted audio signal per channel. For instance, the channel separating unit may be able to separate a channel of an audio signal into a rear channel and a front channel. In this case, the rear channel may correspond to an audio signal outputted from a rear side of the image display device and the front channel may correspond to an audio signal outputted from a front side of the image display device. Besides, the channel separating unit separates a channel into 5.1 channels. In case of a stereo signal, the channel separating unit may be able to separate a corresponding channel into a left channel and a right channel.

The audio processing unit 240 in the control unit 170 may be able to handle base adjustment, treble adjustment, volume adjustment and the like.

A data processing unit (not shown in the drawing) in the control unit 170 may be able to perform data processing on a demultiplexed data signal. For instance, in case that the demultiplexed data signal is a coded data signal, the data processing unit may be able to decode the demultiplexed data signal. In this case, the coded data signal may be EPG (Electronic Program Guide) information including such broadcast information as start and end times of a broadcast program broadcasted on each channel and the like. For instance, in case of ATSC, the EPG information may include ATSC-PSIP (ATSC-Program and System Information Protocol) information. In case of DVB, the EPG information may include DVB-SI (DVB-Service Information) information. In this case, the ATSC-PSIP or DVB-SI information may correspond to the information contained in the aforementioned stream (i.e., 2-byte header of MPEG-2 TS.

Meanwhile, in FIG. 20, a signal from the OSD generating unit 250 and a signal from the video processing unit 230 are mixed together by the mixer 260 and are then 3D processed by the formatter 280, by which the present invention is non-limited. Alternatively, the mixer can be configured to be situated behind the formatter. In particular, the formatter 280 performs 3D processing on an output of the video processing unit 230 and the OSD generating unit 250 performs OSD generation and 3D processing. Thereafter, the mixer 260 may be able to mix the processed 3D signals together.

Meanwhile, the control unit 170 shown in FIG. 20 is provided to show one example of the present invention. The respective components shown in FIG. 20 may be integrated, added or omitted in accordance with an actually implemented option of the control unit 170. In particular, the frame rate converter 270, the formatter 280 and the sound depth control unit 290 may be separately configured instead of being loaded in the control unit 170.

The aforementioned embodiments for an apparatus for controlling depth/distance of sound and method thereof are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

A method of operating an image display device according to the present invention can be implemented into processor-readable codes recorded in a recording medium readable by a processor provided to the image display device. And, the processor-readable media include all kinds of recording devices in which data readable by the processor are saved. The processor-readable media include ROM, RAM, CD-ROM, magnetic tapes, floppy discs, optical data storage devices, and the like for example and also include carrier-wave type implementations such as transmission via Internet. And, the processor-readable recording medium may store and execute the codes which are distributed to a computer system connected via network to be read by the processor according to a distribution system.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of controlling a depth/distance of sound, comprising the steps of:
   extracting at least one object from an image;
   measuring a depth change value in accordance with a motion of the object within the image; and
   changing a depth/distance level of the sound based on the depth change value of the object.

2. The method of claim 1, further comprising the steps of:
   determining whether a depth change of each object is a valid depth change; and
   determining a corresponding object having a changeable depth/distance level of sound among objects respectively having valid depth change values.

3. The method of claim 2, the step of determining whether the depth change of the each object is the valid depth change, comprising the step of determining whether the depth change of the each object is the valid depth change based on a difference between a depth level of each object in a previous frame of the image and a depth level of the each object in a current frame of the image.

4. The method of claim 2, the step of determining the corresponding object having the changeable depth/distance level of the sound, comprising the steps of selecting one object based on a difference between a depth level of each object in a previous frame of the image and a depth level of the each object in a current frame of the image.

5. The method of claim 4, wherein an object having a greatest difference between the depth level in the previous frame and the depth level in the current frame is selected.

6. A method of controlling a depth/distance of sound, comprising the steps of:
   creating a histogram indicating the number of pixels in accordance with a depth level from a disparity image; and
   changing a depth/distance level of the sound based on the histogram.

7. The method of claim 6, the histogram crating step comprising the steps of:
   setting a plurality of depth levels in accordance with a depth of the image;
   determining the pixel number corresponding to each of a plurality of the depth levels; and
   creating the histogram based on the pixel number corresponding to each of a plurality of the depth levels.

8. The method of claim 6, the step of changing a depth/distance level of the sound, comprising the steps of:
   defining a plurality of depth levels in accordance with a depth of the image in the histogram;
   determining a sum of the pixel numbers in a plurality of the defined depth levels; and
   determining the depth/distance level of the sound based on the determined sum of the pixel numbers.

9. The method of claim 6, further comprising the steps of:
   determining an early depth level of the image based on the histogram;
   correcting the early depth level of the image based on at least one selected from the group consisting of a depth change size of the image and a change frequency (count) of the image; and
   changing the depth/distance level of the sound based on the corrected depth level.

10. The method of claim 9, wherein the early depth level of the image is corrected in accordance with a difference between the depth level of a previous frame of the image and the depth level of a current frame of the image.

11. The method of claim 9, wherein the early depth level of the image is corrected based on an absolute value of a difference between depth levels of two contiguous frames in a predetermined interval of the image.

12. The method of claim 6, further comprising the steps of:
determining the number of blocks/pixels failing to be matched right and left in the disparity image;
correcting an early depth level of the image in accordance with the determined number of the blocks/pixels; and
changing the depth/distance level of the sound based on the corrected depth level.

13. The method of claim 6, further comprising the steps of:
correcting an early depth level of the image in accordance with the number of the pixels corresponding to a specific depth level of the histogram; and
changing the depth/distance level of the sound based on the corrected depth level.

14. An apparatus for controlling a depth/distance of sound, comprising:
an object extracting unit extracting at least one object from an image;
a disparity measuring unit measuring a depth change value in accordance with a motion of the object within the image; and
a level changing unit changing a depth/distance level of the sound based on the depth change value of the object.

15. The apparatus of claim 14, wherein the disparity measuring unit determines whether a depth change of each object is a valid depth change and determines a corresponding object having a changeable depth/distance level of sound among objects respectively having valid depth change values.

16. The apparatus of claim 15, wherein the disparity measuring unit determines whether the depth change of the each object is the valid depth change based on a difference between a depth level of each object in a previous frame of the image and a depth level of the each object in a current frame of the image.

17. The apparatus of claim 15, wherein the disparity measuring unit selects one object based on a difference between a depth level of each object in a previous frame of the image and a depth level of the each object in a current frame of the image.

18. The apparatus of claim 17, wherein the disparity measuring unit selects an object having a greatest difference between the depth level in the previous frame and the depth level in the current frame.

19. An apparatus for controlling a depth/distance of sound, comprising:
a disparity measuring unit creating a histogram indicating the number of pixels in accordance with a depth level from a disparity image; and
a level changing unit changing a depth/distance level of the sound based on the histogram.

20. The apparatus of claim 19, the disparity measuring unit creates the histogram based on the number of the pixels corresponding to each depth level defined in accordance with a depth of the image and determines an early depth level of the image based on the histogram.

21. The apparatus of claim 19, the disparity measuring unit defines a plurality of depth levels in accordance with a depth of the image in the histogram and determines the depth/distance level of the sound based on a sum of the pixel numbers in a plurality of the defined depth levels.

22. The apparatus of claim 19, further comprising a level correcting unit correcting an early depth level of the image based on at least one selected from the group consisting of a depth change size of the image and a change frequency (count) of the image.

23. The apparatus of claim 22, wherein the level changing unit changes the depth/distance level of the sound based on the corrected depth level.

24. The apparatus of claim 22, wherein the level correcting unit corrects the early depth level of the image in accordance with a difference between the depth level of a previous frame of the image and the depth level of a current frame of the image.

25. The apparatus of claim 22, wherein the level correcting unit corrects the early depth level of the image based on an absolute value of a difference between depth levels of two contiguous frames in a predetermined interval of the image.

26. The apparatus of claim 22, wherein the level correcting unit determines the number of blocks/pixels failing to be matched right and left in the disparity image and corrects an early depth level of the image in accordance with the determined number of the blocks/pixels.

27. The apparatus of claim 22, wherein the level correcting unit corrects an early depth level of the image in accordance with the number of the pixels corresponding to a specific depth level of the histogram.

* * * * *